United States Patent
Jeon et al.

(10) Patent No.: US 12,034,679 B2
(45) Date of Patent: Jul. 9, 2024

(54) DISPLAY APPARATUS AND OPERATING METHOD THEREOF

(71) Applicant: SAMSUNG ELECTRONICS CO., LTD., Suwon-si (KR)

(72) Inventors: Eunsang Jeon, Suwon-si (KR); Jieun Kim, Suwon-si (KR); Jinhong Kim, Suwon-si (KR); Yeseul Park, Suwon-si (KR); Seokjae Oh, Suwon-si (KR); Bongsung Yu, Suwon-si (KR); Byoungho Yun, Suwon-si (KR); Seunghoon Lee, Suwon-si (KR); Yuseong Jeon, Suwon-si (KR); Sejun Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/105,376

(22) Filed: Feb. 3, 2023

(65) Prior Publication Data
US 2023/0231821 A1    Jul. 20, 2023

Related U.S. Application Data

(63) Continuation of application No. PCT/KR2023/000376, filed on Jan. 9, 2023.

(30) Foreign Application Priority Data

Jan. 17, 2022    (KR) ........................ 10-2022-0006829

(51) Int. Cl.
*H04L 51/04*    (2022.01)
*H04L 67/146*    (2022.01)

(52) U.S. Cl.
CPC ............ *H04L 51/04* (2013.01); *H04L 67/146* (2013.01)

(58) Field of Classification Search
None
See application file for complete search history.

(56) References Cited

U.S. PATENT DOCUMENTS

| 7,929,532 B2 | 4/2011 | Chen |
| 2003/0014532 A1 | 1/2003 | Chang et al. |
| 2009/0228944 A1 | 9/2009 | Bodlaender |

(Continued)

FOREIGN PATENT DOCUMENTS

| JP | 11-96091 | 4/1999 |
| KR | 10-2002-0027432 A | 4/2002 |

(Continued)

OTHER PUBLICATIONS

Search Report and Written Opinion dated Apr. 26, 2023 issued in International Patent Application No. PCT/KR2023/000376.

*Primary Examiner* — Joshua Joo
(74) *Attorney, Agent, or Firm* — Nixon & Vanderhye, P.C.

(57) ABSTRACT

An example method of operating a display apparatus includes obtaining display apparatus state information indicating data processing performance of the display apparatus, transmitting the display apparatus state information to a server that provides a chat service, receiving chat messages transmitted from the server according to a message throughput determined based on the display apparatus state information, and outputting the received chat messages.

15 Claims, 16 Drawing Sheets

(56) References Cited

U.S. PATENT DOCUMENTS

| | | | |
|---|---|---|---|
| 2013/0346627 A1* | 12/2013 | Wormley | H04N 21/6125 |
| | | | 709/232 |
| 2017/0155729 A1* | 6/2017 | Kizhakkiniyil | H04L 51/06 |
| 2017/0289583 A1 | 10/2017 | Liu | |
| 2019/0182189 A1* | 6/2019 | Amble | H04L 51/04 |
| 2020/0304750 A1* | 9/2020 | Lynch | H04N 9/7921 |
| 2021/0174372 A1 | 6/2021 | Jadhav | |
| 2023/0124659 A1* | 4/2023 | Hearnden | G06F 40/123 |
| | | | 715/229 |

FOREIGN PATENT DOCUMENTS

| | | |
|---|---|---|
| KR | 10-2007-0005690 | 1/2007 |
| KR | 10-1543425 | 8/2015 |
| KR | 10-2015-0131803 | 11/2015 |
| KR | 10-2015-0132040 A | 11/2015 |
| KR | 10-2016-0073667 A | 6/2016 |
| KR | 10-2021-0051752 A | 5/2021 |
| KR | 10-2021-0144117 | 11/2021 |
| KR | 10-2339430 | 12/2021 |
| KR | 10-2348748 | 1/2022 |

\* cited by examiner (RELATED ART)

(RELATED ART)

DISPLAY APPARATUS AND OPERATING METHOD THEREOF

CROSS-REFERENCE TO RELATED APPLICATIONS

This application is a continuation of International Application No. PCT/KR2023/000376 designating the United States, filed on Jan. 9, 2023, in the Korean Intellectual Property Receiving Office and claiming priority to Korean Patent Application No. 10-2022-0006829, filed on Jan. 17, 2022, in the Korean Intellectual Property Office, the disclosures of which are incorporated by reference herein in their entireties.

BACKGROUND

Field

The disclosure relates to a display apparatus and an operating method thereof, and more particularly, to a display apparatus capable of receiving and outputting messages according to the performance of the display apparatus, and an operating method of the display apparatus.

Description of Related Art

With the development of multimedia and network technologies, the number of applications for sharing particular interests or activities among people has increased. For example, people who are watching broadcast content transmitted to a plurality of users in real time may share their opinions or feelings about the broadcast content using a chat service.

A server providing the chat service collectively transmits, to clients, all chat messages transmitted to the server. However, because the clients as participants in a chat may have different specifications and different surrounding network states, some clients may not properly process and output the chat messages transmitted from the server. Accordingly, a technique for transmitting chat messages in consideration of the state or performance of a client is required.

SUMMARY

Embodiments of the disclosure provide a display apparatus for obtaining display apparatus state information and transmitting the display apparatus state information to a server, and an operating method of the display apparatus.

Embodiments of the disclosure provide a display apparatus for receiving chat messages transmitted from a server according to a message throughput determined based on display apparatus state information, and an operating method of the display apparatus.

According to an example embodiment of the disclosure, a display apparatus includes: a display, a communicator comprising communication circuitry, a memory including one or more instructions, wherein, the instructions, when executed, by a processor, cause the processor to: obtain display apparatus state information indicating data processing performance of the display apparatus, transmit, through the communicator, the display apparatus state information to a server configure to provide a chat service, receive, through the communicator, chat messages transmitted from the server according to a message throughput determined based on the display apparatus state information, and output the received chat messages through the display.

In an example embodiment of the disclosure, the display apparatus state information may include at least one of apparatus state information or network state information, the apparatus state information may include at least one of a model, an operating system, a central processing unit (CPU) processing speed, an available CPU capacity, or a memory capacity of the display apparatus, and the network state information may include a network latency.

In an example embodiment of the disclosure, the processor may be further configured by executing the one or more instructions to: request, from the server through the communicator, a uniform resource locator (URL) for chat message transmission, receive the URL for chat message transmission transmitted from the server in response to the request, and obtain the network latency from a time period between a point in time at which the URL for chat message transmission is requested and a point in time at which the URL for chat message transmission is received.

In an example embodiment of the disclosure, the display apparatus may further include an input unit comprising input circuitry, and the processor may be further configured by executing the one or more instructions to: transmit a first chat message input through user input unit, to the server through the communicator, receive a response as to whether the first chat message is received, the response being transmitted from the server in response to the first chat message, and obtain the network latency from a time period between a point in time at which the first chat message is transmitted and a point in time at which the response as to whether the first chat message is received is received.

In an example embodiment of the disclosure, the processor may be further configured by executing the one or more instructions to: transmit, to the server through the communicator, the display apparatus state information and simultaneously request, from the server through the communicator, a WebSocket protocol-based URL for chat message reception.

In an example embodiment of the disclosure, the processor may be further configured by executing the one or more instructions to: receive, from the server, a request for transmission of the display apparatus state information, and transmit the display apparatus state information to the server in response to the request.

In an example embodiment of the disclosure, the processor may be further configured by executing the one or more instructions to: receive, from the server, a WebSocket protocol-based URL for receiving the chat messages transmitted according to the determined message throughput, and access the WebSocket protocol-based URL to receive the chat messages transmitted from the server according to the message throughput.

In an example embodiment of the disclosure, the processor may be further configured by executing the one or more instructions to: obtain updated display apparatus state information, transmit the updated display apparatus state information to the server, and receive chat messages transmitted from the server according to a new message throughput determined based on the updated display apparatus state information.

In an example embodiment of the disclosure, the processor may be further configured by executing the one or more instructions to: receive, from the server, a new WebSocket protocol-based URL for receiving the chat messages transmitted according to the new message throughput, and access the new WebSocket protocol-based URL to receive the chat messages transmitted from the server according to the new message throughput.

According to an example embodiment of the disclosure, a server configured to provide a chat service may include: a communicator, comprising communication circuitry, configured to perform communication with a plurality of display apparatuses, queues configured to store messages, the queues including a first queue and a second queue, and a processor configured by executing one or more instructions included in a memory to: determine a first message throughput based on first display apparatus state information received from a first display apparatus among the plurality of display apparatuses, control the first queue to adjust, to N (N being a natural number), a number of chat messages to be transmitted per second, with respect to chat messages received from the plurality of display apparatuses, according to the first message throughput, and transmit N chat messages per second to the first display apparatus through a first WebSocket protocol-based uniform resource locator (URL) mapped to the first message throughput, determine a second message throughput based on second display apparatus state information received from a second display apparatus among the plurality of display apparatuses, and control the second queue to adjust, M (M being a natural number different from N), the number of chat messages to be transmitted per second, with respect to the chat messages received from the plurality of display apparatuses, according to the second message throughput, and transmit M chat messages per second to the second display apparatus through a second WebSocket-based URL mapped to the second message throughput, wherein the first message throughput is different from the second message throughput, and the first WebSocket protocol-based URL is different from the second WebSocket protocol-based URL.

In an example embodiment of the disclosure, at least one of the first queue or the second queue may be configured to: adjust the number of chat messages to be transmitted, according to the determined message throughput by transmitting some of the chat messages received from the plurality of display apparatuses, or by adjusting a time period during which to transmit the chat messages received from the plurality of display apparatuses, and transmit some of the chat messages received from the plurality of display apparatuses, using at least one of a scheme of transmitting a certain number of chat messages received earlier among the chat messages received from the plurality of display apparatuses, a scheme of transmitting a certain number of chat messages received later among the chat messages received from the plurality of display apparatuses, a scheme of transmitting only a certain number of randomly selected chat messages, a scheme of omitting duplicate messages, or a scheme of selecting and transmitting chat messages based on accounts of users of the plurality of display apparatuses.

According to an example embodiment of the disclosure, a method of operating a display apparatus may include: obtaining display apparatus state information indicating data processing performance of the display apparatus, transmitting the display apparatus state information to a server configured to provide a chat service, receiving chat messages transmitted from the server according to a message throughput determined based on the display apparatus state information, and outputting the received chat messages.

According to an example embodiment of the disclosure, a method of operating a server may include: determining a first message throughput based on first display apparatus state information received from a first display apparatus among a plurality of display apparatuses, adjusting, to N (N being a natural number), a number of chat messages to be transmitted per second, with respect to chat messages received from the plurality of display apparatuses, according to the first message throughput, and transmitting N chat messages per second to the first display apparatus through a first WebSocket protocol-based uniform resource locator (URL) mapped to the first message throughput.

According to an example embodiment of the disclosure, in a non-transitory computer-readable recording medium having recorded thereon a program for implementing an operating method of a display apparatus, the operating method may include: obtaining display apparatus state information indicating data processing performance of the display apparatus, transmitting the display apparatus state information to a server configured to provide a chat service, receiving chat messages transmitted from the server according to a message throughput determined based on the display apparatus state information, and outputting the received chat messages.

According to various example embodiments of the disclosure, a display apparatus and an operating method thereof may obtain display apparatus state information and transmit the display apparatus state information to a server.

According to various example embodiments of the disclosure, the display apparatus and the operating method thereof may receive chat messages transmitted from a server according to a message throughput determined based on display apparatus state information.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
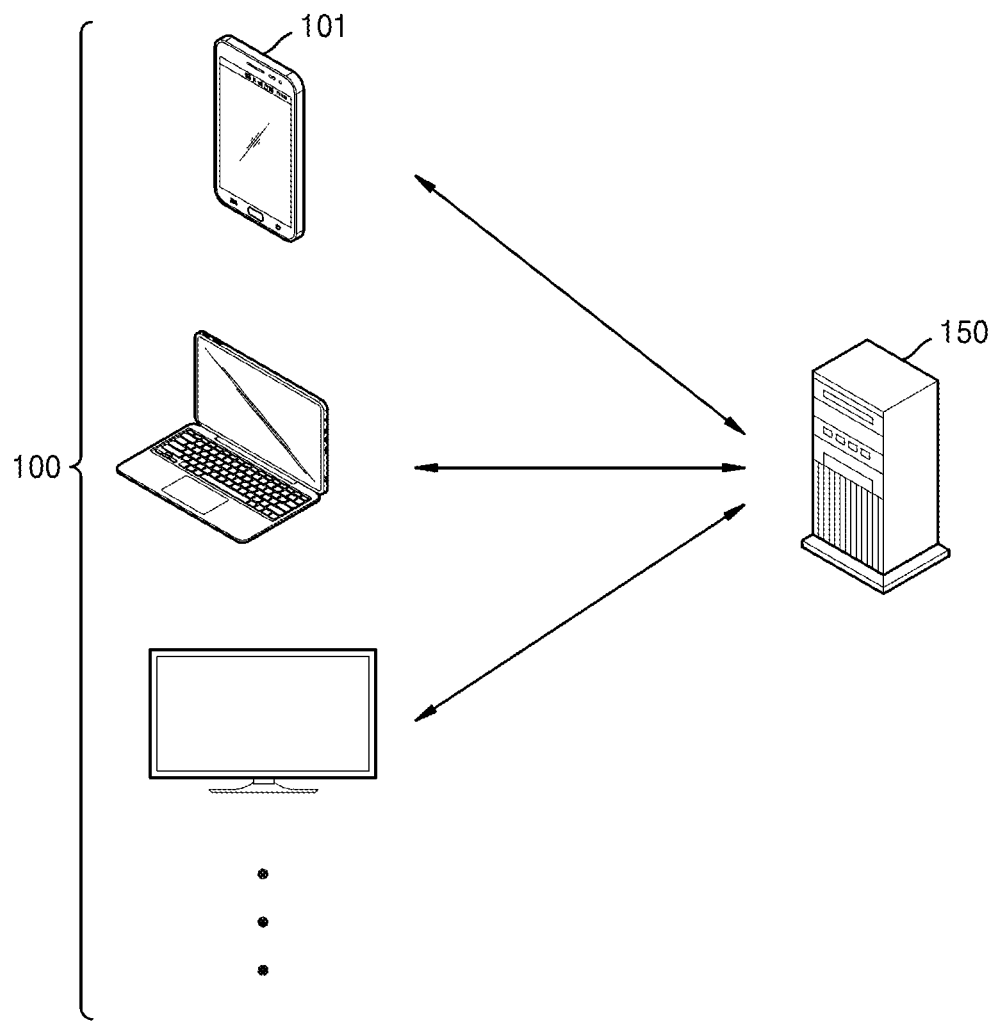
FIG. 1 is a diagram illustrating an example chat service providing system according to various embodiments.

Throughout the disclosure, the expression "at least one of a, b or c" indicates only a, only b, only c, both a and b, both a and c, both b and c, all of a, b, and c, or variations thereof.

Hereinafter, various example embodiments of the disclosure will be described in greater detail with reference to the accompanying drawings. The disclosure may, however, be embodied in many different forms and should not be construed as being limited to the embodiments of the disclosure set forth herein.

Although the terms used herein are generic terms, which are currently widely used and are selected by taking into consideration functions thereof, the meanings of the terms may vary according to intentions of those skilled in the art, legal precedents, or the advent of new technology. Thus, the terms should be defined not by simple appellations thereof but based on the meanings thereof and the context of descriptions throughout the disclosure.

In addition, terms used herein are for describing various embodiments and are not intended to limit the scope of the disclosure.

Throughout the disclosure, when a part is referred to as being "connected to" another part, it may be "directly connected to" the other part or be "electrically connected to" the other part through an intervening element.

The term "the" and other demonstratives similar thereto in the descriptions of embodiments (especially in the following claims) should be understood to include a singular form and plural forms. In addition, when there is no description explicitly specifying an order of operations of a method according to the disclosure, the operations may be performed in an appropriate order. The disclosure is not limited to the order of the operations described.

As used herein, phrases such as "in some embodiments" or "in an embodiment" does not necessarily indicate the same embodiment of the disclosure.

Various embodiments of the disclosure may be represented by block components and various process operations. All or some of such functional blocks may be implemented by various numbers of hardware and/or software components that perform particular functions. For example, functional blocks of the disclosure may be implemented using one or more microprocessors, or using circuit elements for intended functions. For example, the functional blocks of the disclosure may be implemented using various programming or scripting languages. The functional blocks may be implemented as an algorithm to be executed by one or more processors. In addition, the disclosure may employ related-art techniques for electronic configuration, signal processing, and/or data processing, etc. Terms such as "mechanism", "element", "unit", or "component" are used in a broad sense and are not limited to mechanical or physical components.

Connection lines or connection members between components illustrated in the drawings are merely illustrative of functional connections and/or physical or circuit connections. In an actual apparatus, connections between components may be represented by various functional connections, physical connections, or circuit connections that are replaceable or added.

The terms described in the disclosure, such as " . . . er (or)", " . . . unit", " . . . module", etc., denote a unit that performs at least one function or operation, which may be implemented as hardware (e.g., circuitry) or software or a combination thereof.

In addition, in the disclosure, the term "user" may refer to a person who uses at least one of a display apparatus or a server, and may include a consumer, an evaluator, a viewer, an administrator, or an installer.

Hereinafter, the disclosure will be described in greater detail with reference to the accompanying drawings.

FIG. 1 is a diagram illustrating an example chat service providing system according to various embodiments.

Referring to FIG. 1, the chat service providing system according to an embodiment of the disclosure may include a plurality of display apparatuses 100 and a server 150.

The plurality of display apparatuses 100 are clients that communicate with the server 150, and may transmit and receive data to and from the server 150 through mutual networking with the server 150.

In an embodiment of the disclosure, the server 150 may be a chat server that provides a chat service.

In an embodiment of the disclosure, the plurality of display apparatuses 100 may be implemented as various types of electronic apparatuses capable of providing a chat service to a user by performing communication with the server 150. In an embodiment of the disclosure, the plurality of display apparatuses 100 may be implemented as electronic devices capable of outputting a chat message through a screen. For example, the plurality of display apparatuses 100 may be various types of electronic devices such as, for example, and without limitation, a digital television, a smart phone, a desktop computer, a tablet personal computer (PC), a laptop computer, a personal digital assistant (PDA), a global positioning system (GPS) device, a smart mirror, an electronic book terminal, a navigation device, a kiosk, a digital camera, a wearable device, a smart watch, a home network device, a security device, a medical device, and the like, but are not limited thereto. The plurality of display apparatuses 100 may be stationary or mobile.

In an embodiment of the disclosure, each of the plurality of display apparatuses 100 may be implemented as a flat display apparatus, a curved display apparatus with a screen having a curvature, or a flexible display apparatus having an adjustable curvature. The output resolution of the plurality of display apparatuses 100 may include, for example, high definition (HD), full HD, ultra HD, or a higher resolution than ultra HD.

In an embodiment of the disclosure, the plurality of display apparatuses 100 may receive broadcast content. For example, the plurality of display apparatuses 100 may receive broadcast content from a broadcasting station in real time through a tuner. The broadcasting station may transmit, using a broadcast content server, the same broadcast content to the plurality of display apparatuses 100 that request the broadcast content.

In an embodiment of the disclosure, the broadcast content server and the server 150 providing the chat service may be the same server or may be separate servers.

The server 150 may receive information about broadcast content currently being broadcast by the broadcast content server. The information about the broadcast content may include additional information, such as an electronic program guide (EPG) about a broadcast program. The EPG may refer to a broadcast program guide service including a broadcast time, content, cast information, and the like of a broadcast program. The server 150 may create a chat room associated with broadcast content using information about the broadcast content received from the broadcast content server. For example, the server 150 may determine the title of the chat room based on the title or information about broadcast time, main characters, and the like of a corresponding program obtained from EPG information, and create the chat room having the determined title.

The plurality of display apparatuses 100 may access the server 150 in a web-based manner. The plurality of display apparatuses 100 may transmit, to the server 150, chat messages input by their respective users.

The server 150 may relay the chat messages. The server 150 may receive the chat messages from the plurality of display apparatuses 100 participating in the chat room and transmit the received chat messages to all of the plurality of display apparatuses 100 in the chat room.

In an embodiment of the disclosure, when transmitting the chat messages to the plurality of display apparatuses 100, the server 150 may adjust the number of messages to be transmitted to each display apparatus, according to the performance or state of the display apparatus, and then transmit the adjusted number of chat messages to the display apparatus. To this end, the server 150 may, from each display apparatus, receive display apparatus state information indicating the performance or state of the display apparatus.

In an embodiment of the disclosure, one display apparatus 101 of the plurality of display apparatuses 100 may obtain display apparatus state information.

In an embodiment of the disclosure, the display apparatus state information may include information indicating the data processing performance of the display apparatus 101, and may indicate an amount of useful work performed by a data processing system of the display apparatus 101. The rate at which the system of the display apparatus 101 receives chat messages from the server 150, or the workload or efficiency of the system of the display apparatus 101 in processing received chat messages may vary depending on the data processing performance of the display apparatus 101.

In an embodiment of the disclosure, the display apparatus state information may include at least one of apparatus state information or network state information.

In an embodiment of the disclosure, the apparatus state information may be information about the data processing performance of the display apparatus 101 or a current state of the display apparatus 101 regarding data processing capability. For example, the apparatus state information may include information indicating data processing performance according to specifications of the display apparatus 101, such as model, operating system, central processing unit (CPU) processing speed, etc. The apparatus state information may include information about a current state of the display apparatus 101 that may affect data processing, such as an available capacity of a CPU included in the display apparatus 101, a memory capacity, or the like.

In an embodiment of the disclosure, the display apparatus 101 may obtain at least one of the model, operating system, CPU processing speed, available CPU capacity, or memory capacity of the display apparatus 101, from system information of the display apparatus 101, and obtain the apparatus state information using the obtained information.

In an embodiment of the disclosure, the network state information may refer to information that affects the network performance between the display apparatus 101 and the server 150. The network state information may include a network latency. The network latency may refer to a time period taken for data transmitted from a source to be received at a destination. A round-trip network latency may refer to a waiting period between a time point at which the display apparatus 101 transmits data to the server 150 and a time point at which the display apparatus receives data from the server 150.

The rate and efficiency of transmission and reception of chat messages between the server 150 and the display apparatus 101 may vary depending on the network latency. For example, when the network performance is poor due to a high network latency, the response speed of a chat application providing a chat service may decrease or the application may stop working.

In an embodiment of the disclosure, the display apparatus 101 may obtain the network latency using a time period taken for data transmission/reception with the server 150.

In an embodiment of the disclosure, the display apparatus 101 may request, from the server 150, a uniform resource locator (URL) for chat message transmission, and receive, from the server 150, the URL for chat message transmission, which is transmitted in response to the request. In an embodiment of the disclosure, the display apparatus 101 may obtain the network latency from a time period between a time point at which the URL for chat message transmission is requested and a time point at which the URL for chat message transmission is received.

In an embodiment of the disclosure, the display apparatus 101 may transmit a chat message input by a user, to the server 150 through a communication network, and receive, from the server 150, a response as to whether the chat message is received. The display apparatus 101 may obtain a network latency from a time period between a time point at which the chat message is transmitted and a time point at which the response as to whether the chat message is received is received.

In an embodiment of the disclosure, the display apparatus 101 may transmit, to the server 150, display apparatus state information including at least one of network state information including a network latency, or apparatus state information.

In an embodiment of the disclosure, the display apparatus 101 may transmit the display apparatus state information to the server 150 and simultaneously request, from the server 150, a WebSocket protocol-based URL for chat message reception.

In an embodiment of the disclosure, the display apparatus 101 may receive, from the server 150, a request for transmission of the display apparatus state information. The display apparatus 101 may transmit the display apparatus state information to the server 150 in response to receiving the request for transmission of the display apparatus state information from the server 150.

In an embodiment of the disclosure, the server 150 may determine, based on the display apparatus state information, a message throughput at which to transmit messages to the display apparatus 101. The message throughput may refer to the number of messages to be processed per unit time period. In an embodiment of the disclosure, the message throughput may refer to the number of messages to be transmitted per second from the server 150 to the display apparatus 101.

In an embodiment of the disclosure, the server 150 may determine, based on the display apparatus state information, a message throughput, e.g., the number of messages to be transmitted per second. With respect to the chat messages received from the plurality of display apparatuses 100, the server 150 may adjust the number of messages to be transmitted, according to the message throughput determined based on the display apparatus state information. The server 150 may transmit the adjusted number of chat messages to the display apparatus 101.

In an embodiment of the disclosure, the server 150 may determine a WebSocket protocol-based URL through which to transmit the chat messages according to the message throughput determined based on the display apparatus state information. The server 150 may inform the display apparatus 101 of the determined WebSocket protocol-based URL.

In an embodiment of the disclosure, the display apparatus 101 may receive, from the server 150, the WebSocket protocol-based URL through which to receive the chat messages. The display apparatus 101 may access the WebSocket protocol-based URL informed of by the server 150, and then receive the chat messages, which are transmitted from the server 150 according to a message throughput determined based on the display apparatus state information.

In an embodiment of the disclosure, the display apparatus 101 may newly obtain display apparatus state information. In order to be distinguished from the previously obtained display apparatus state information, the newly obtained display apparatus state information is referred to as 'updated display apparatus state information'. The display apparatus 101 may obtain updated display apparatus state information at preset (e.g., specified) periods or whenever a certain event occurs.

The preset period may include a preset time interval, a preset time point (or point in time), or a random time interval.

The certain event may include, for example, new communication being performed between the display apparatus 101 and the server 150. When new data is transmitted to and received from the server 150, the display apparatus 101 may newly obtain a network latency from a time period taken for the data transmission and reception, and obtain updated display apparatus state information using the newly obtained network latency.

The certain event may include at least one of an available capacity of a CPU or a memory capacity of the display apparatus 101 being changed by a reference value or greater. When the available capacity of the CPU or the memory capacity is changed by the reference value or greater, the display apparatus 101 may obtain updated display apparatus state information including information about the change.

In an embodiment of the disclosure, the display apparatus 101 may transmit the updated display apparatus state information to the server 150.

In an embodiment of the disclosure, upon receiving the updated display apparatus state information from the display apparatus 101, the server 150 may newly determine the message throughput based on the updated display apparatus state information. The server 150 may determine a new WebSocket protocol-based URL through which to transmit chat messages at the newly determined message throughput, and transmit the new WebSocket protocol-based URL to the display apparatus 101.

In an embodiment of the disclosure, upon receiving the new WebSocket protocol-based URL from the server 150, the display apparatus 101 may access the new WebSocket protocol-based URL and then receive chat messages transmitted from the server 150 according to the newly determined message throughput.

As described above, according to an embodiment of the disclosure, the display apparatus 101 may obtain display apparatus state information indicating the data processing performance of the display apparatus 101, and transmit the display apparatus state information to the server 150.

According to an embodiment of the disclosure, the server 150 may adjust the number of chat messages to be transmitted to the display apparatus 101, based on the display apparatus state information received from the display apparatus 101.

According to an embodiment of the disclosure, the display apparatus 101 may receive, from the server 150, chat messages, the number of which is adjusted to be suitable for the data processing performance of the display apparatus 101. Accordingly, the display apparatus 101 may output the chat messages on the screen without interruption.

Figure 2A:
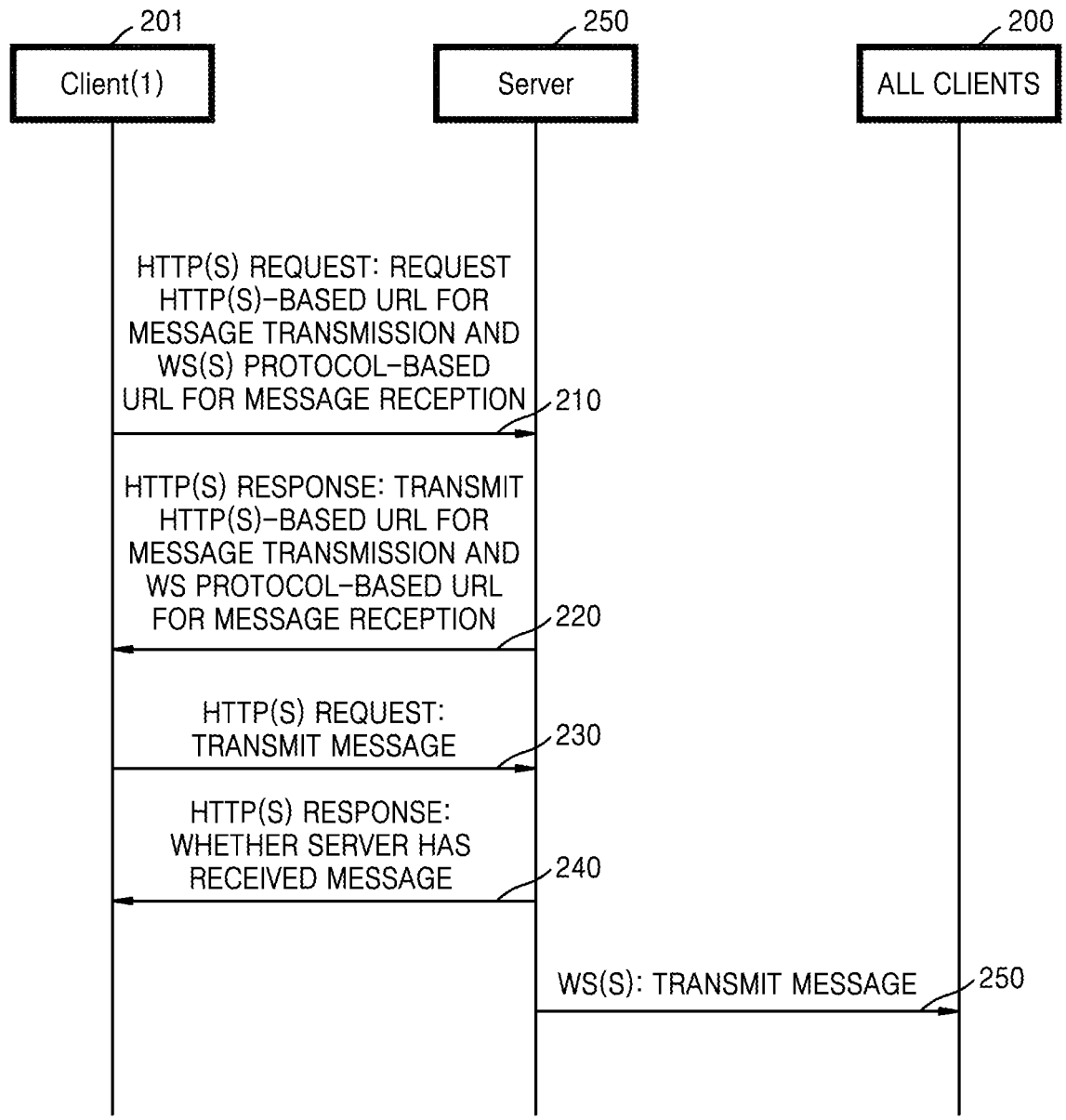
FIG. 2A is a signal flow diagram for illustrating an example in which a server and a plurality of clients transmit and receive chat messages according to the related art.
Figure 2B:
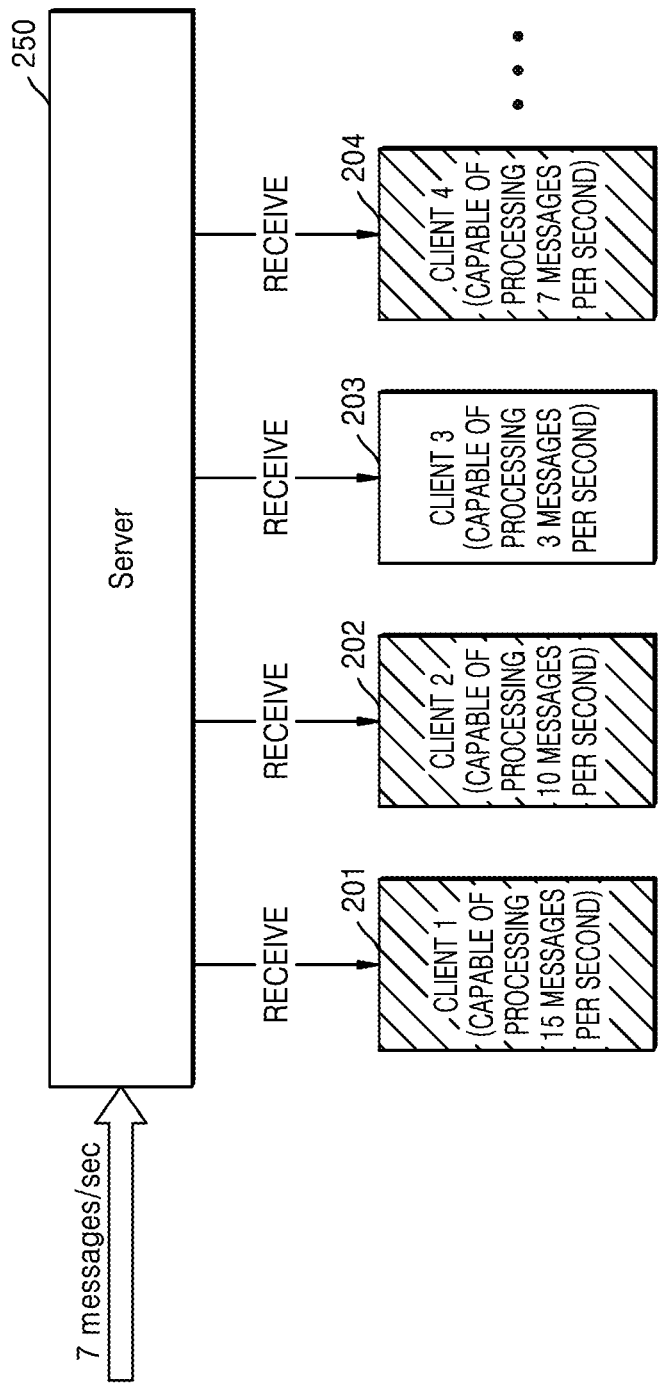
FIG. 2B is a diagram illustrating an example in which a server and a plurality of clients transmit and receive chat messages according to the related art.

FIGS. 2A and 2B are signal flow diagrams illustrating examples in which a server 250 and a plurality of clients 200 including clients 201 to 204 (hereinafter, also referred to as the first to fourth clients 201 to 204) transmit and receive chat messages according to the related art.

FIGS. 2A and 2B illustrate a process in which the server 250 establishes networking with the plurality of clients 200, receives chat messages from the plurality of clients 200, and transmits the chat messages to the plurality of clients 200.

Referring to FIG. 2A, the first client 201, which is one of the plurality of clients 200, may request, from the server 250, a WebSocket protocol-based URL for message reception, together with a hypertext transfer protocol (HTTP)-based URL for message transmission (operation 210). HTTP may operate in such a manner that a result of processing performed by a server in response to a request message from a client is returned in a response message.

In response to the request from the first client 201, the server 250 transmits, to the first client 201, the HTTP-based URL for message transmission and the WebSocket protocol-based URL for message reception (operation 220).

Thereafter, the first client 201 transmits a chat message input thereto by a user, to the server 250 through the HTTP-based URL received from the server 250 (operation 230).

When the chat message is received from the first client 201, the server 250 transmits, to the first client 201, whether the chat message is received, in response to the received chat message (operation 240).

The server 250 transmits the chat messages received from the plurality of clients 200, to each of the plurality of clients 200 using the WebSocket protocol-based URL (operation 250).

Referring to FIG. 2B, it is assumed that the server 250 receives, from the plurality of clients 200, chat messages, for example, at a rate of 7 chat messages per second. The server 250 creates a WebSocket protocol-based URL for transmitting the chat messages, and transmits the created WebSocket protocol-based URL to each client to receive the chat messages. The server 250 transmits the same WebSocket protocol-based URL to all of the plurality of clients 200.

Each client accesses the WebSocket protocol-based URL received from the server 250 to receive the chat messages from the server 250.

The server 250 transmits messages, which are received at a rate of 7 messages per second, to each of the plurality of clients through one WebSocket protocol-based URL at a rate of 7 messages per second. FIG. 2B illustrates that the server 250 transmits chat messages to the first to fourth clients 201, 202, 203, and 204 among the plurality of clients 200.

The clients may differ in data processing performance. For example, it is assumed that the first client 201 is capable of processing 15 messages per second, the second client 202 is capable of processing 10 messages per second, the third client 203 is capable of processing 3 messages per second, and the fourth client 204 is capable of processing 7 messages per second.

When each client receives 7 chat messages per second from the server 250, the first client 201, the second client 202, and the fourth client 204 is able to receive the chat messages transmitted from the server 250, process the chat messages, and output the processed chat messages on their screens. However, the third client 203 capable of processing only 3 messages per second is unable to process all of 7 messages received from the server 250 per second, the chat application providing the chat service may not normally operate. In this case, the third client 203 may terminate the chat application or the chat application may stop working without any response.

As described above, when the clients, which differ in data processing performance, receive the same number of chat messages from the server 250, reception of the chat messages may be interrupted according to the data processing performance of each client.

Figure 3:
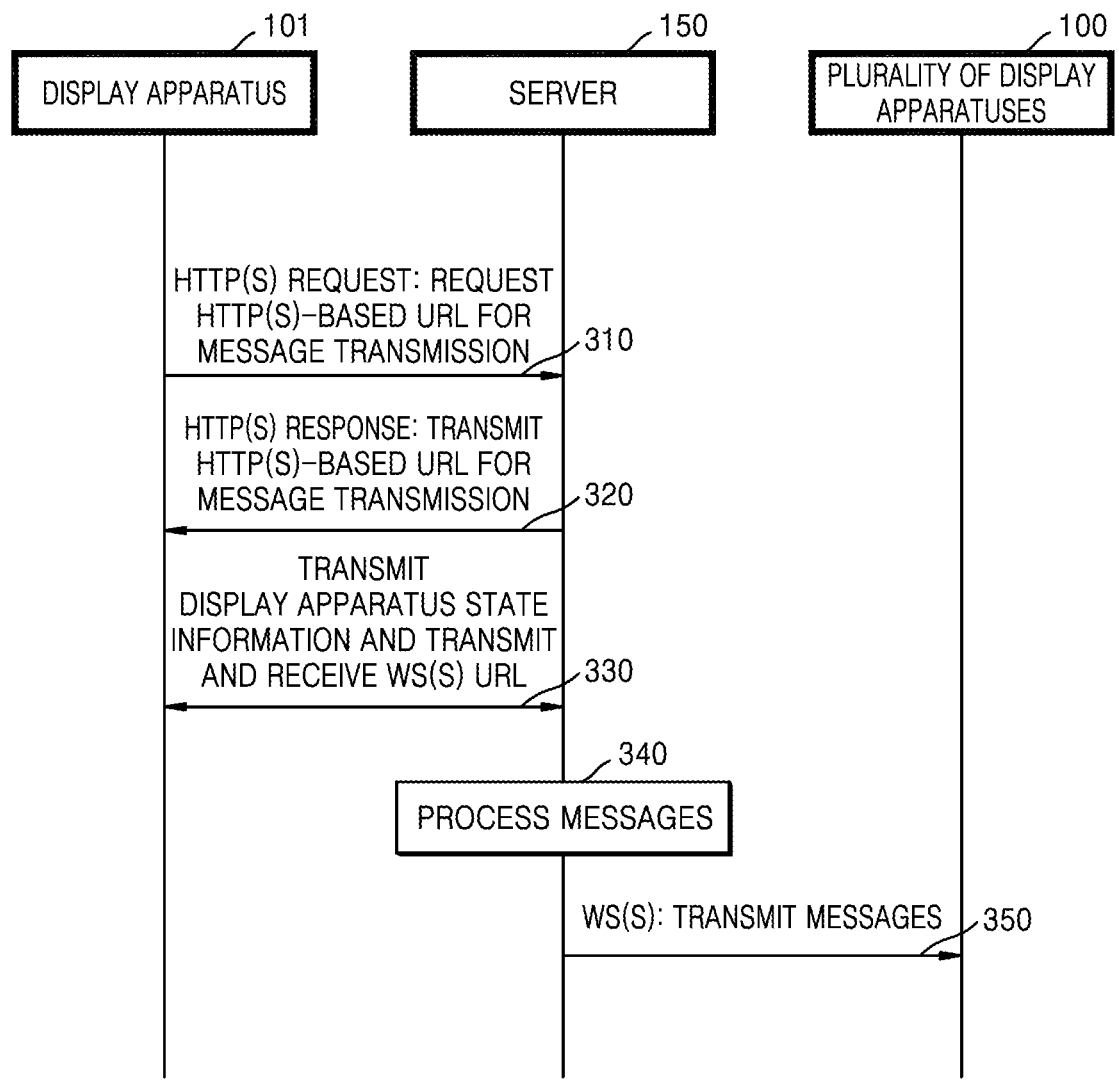
FIG. 3 is a signal flow diagram illustrating an example in which a plurality of display apparatuses and a server transmit and receive chat messages, according to various embodiments.

FIG. 3 is a signal flow diagram illustrating an example in which the plurality of display apparatuses 100 and the server 150 transmit and receive chat messages, according to various embodiments.

In an embodiment of the disclosure, the plurality of display apparatuses 100 and the server 150 may establish networking using HTTP. However, the disclosure is not limited thereto, and the plurality of display apparatuses 100 and the server 150 may transmit and receive data to and from each other using various types of protocols.

Referring to FIG. 3, one display apparatus 101 included in the plurality of display apparatuses 100 may request, from the server 150, an HTTP-based URL for message transmission (operation 310).

In the example illustrated in FIGS. 2A and 2B, the server 250 transmits the messages to all of the plurality of clients 200 through the same WebSocket protocol-based URL, and thus, referring to operation 210 of FIG. 2A, the first client 201 requests, from the server 250, the HTTP-based URL for message transmission, together with the WebSocket protocol-based URL for message reception.

However, according to an embodiment of the disclosure, in FIG. 3, unlike operation 210 of FIG. 2A, the display apparatus 101 requests, from the server 150, the HTTP-based URL for message transmission but does not request a WebSocket protocol-based URL for message reception.

The server 150 may create the HTTP-based URL for message transmission and transmit the created HTTP-based URL to the display apparatus 101, in response to receiving the request for the HTTP-based URL from the display apparatus 101 (operation 320).

In an embodiment of the disclosure, the display apparatus 101 may obtain a network latency in consideration of a time period between a time point at which an HTTP request is transmitted to the server 150 to a time point at which an HTTP response is received from the server 150. In an embodiment of the disclosure, the display apparatus 101 may obtain network state information including a network latency.

In an embodiment of the disclosure, the display apparatus 101 may obtain apparatus state information. The apparatus state information may include at least one of the model, operating system, CPU processing speed, available CPU capacity, or memory capacity of the display apparatus 101.

In an embodiment of the disclosure, the display apparatus 101 may obtain display apparatus state information including at least one of network state information or apparatus state information.

In an embodiment of the disclosure, the display apparatus 101 may transmit the display apparatus state information to the server 150 and receive a WebSocket protocol-based URL for message reception from the server 150 (operation 330).

Hereinafter, operation 330 will be described in greater detail.

In an embodiment of the disclosure, the display apparatus 101 may request, from the server 150, the WebSocket protocol-based URL for message reception for message reception. For example, the display apparatus 101 may request the server 150 to transmit the WebSocket protocol-based URL for message reception, based on HTTP.

In an embodiment of the disclosure, the display apparatus 101 may request, from the server 150, the WebSocket protocol-based URL and simultaneously transmit the display apparatus state information to the server 150. Unlike that the first client 201 requests, from the server 250, the WebSocket protocol-based URL for message transmission together with the HTTP-based URL for message transmission in operation 210 of FIG. 2A, referring to FIG. 3, the display apparatus 101 may request the server 150 to transmit the WebSocket protocol-based URL, separately from the request to transmit the HTTP-based URL for message transmission.

According to an embodiment of the disclosure, rather than transmitting messages to all clients through the same WebSocket protocol-based URL, the server 150 may determine a message throughput in consideration of data processing performance of each client, and transmit messages to each client using a WebSocket protocol-based URL address suitable for the determined message throughput. Accordingly, the display apparatus 101 may transmit, to the server 250, the display apparatus state information indicating the data processing performance of the display apparatus 101, and simultaneously request the server 250 to transmit a WebSocket protocol-based URL through which messages are received, according to the message throughput determined in consideration of the display apparatus state information.

In an embodiment of the disclosure, the server 150 may receive, from the display apparatus 101, a WebSocket protocol-based URL request, and, in response thereto, transmit a WebSocket protocol-based URL to the display apparatus 101. In more detail, the server 150 may determine, using the display apparatus state information received from the display apparatus 101, a message throughput at which to transmit messages to the display apparatus 101. The server 150 may determine a WebSocket protocol-based URL through which to transmit messages at the determined message throughput, and transmit the determined WebSocket protocol-based URL to the display apparatus 101. The server 150 may determine, based on display apparatus state information of each display apparatus, a message throughput at which to transmit messages to the display apparatus, and transmit a WebSocket protocol-based URL through which to transmit messages to the display apparatus at the determined message throughput.

In an embodiment of the disclosure, the server 150 may process messages at the determined message throughput (operation 340). The server 150 may adjust, according to the determined message throughput, the number of messages to be transmitted, by selecting only some of a plurality of chat messages received from the plurality of display apparatuses 100 or adjusting a time period during which to transmit chat messages.

The server 150 may transmit the plurality of chat messages received from the plurality of display apparatuses 100, to all of the plurality of display apparatuses 100 through WebSocket protocol-based URLs transmitted to the respective display apparatuses (operation 350). In this case, the server 150 may adjust the number of messages to be transmitted to each display apparatus, according to the message throughput determined based on state information of the display apparatus, and transmit the adjusted number of chat messages to the display apparatus through the WebSocket protocol-based URL transmitted to the display apparatus. Each display apparatus may access the WebSocket protocol-based URL received from the server 150, and then receive the chat messages, the number of which is adjusted to be suitable for the display apparatus.

As described above, according to an embodiment of the disclosure, the display apparatus 101 may obtain a network latency in a process of requesting a URL for message transmission and receiving the URL, and transmit, to the server 150, display apparatus state information including the network latency and simultaneously request the server 150 to transmit a WebSocket protocol-based URL.

According to an embodiment of the disclosure, the server 150 may adjust the number of chat messages to be transmitted to the display apparatus 101, using the display apparatus state information of the display apparatus 101, and transmit, to the display apparatus 101, a WebSocket protocol-based URL through which to transmit the adjusted number of chat messages.

According to an embodiment of the disclosure, the display apparatus 101 may access the WebSocket protocol-based URL provided by the server 150, and then receive and output the chat messages, the number of which is adjusted according to the data processing performance of the display apparatus 101.

Figure 4:
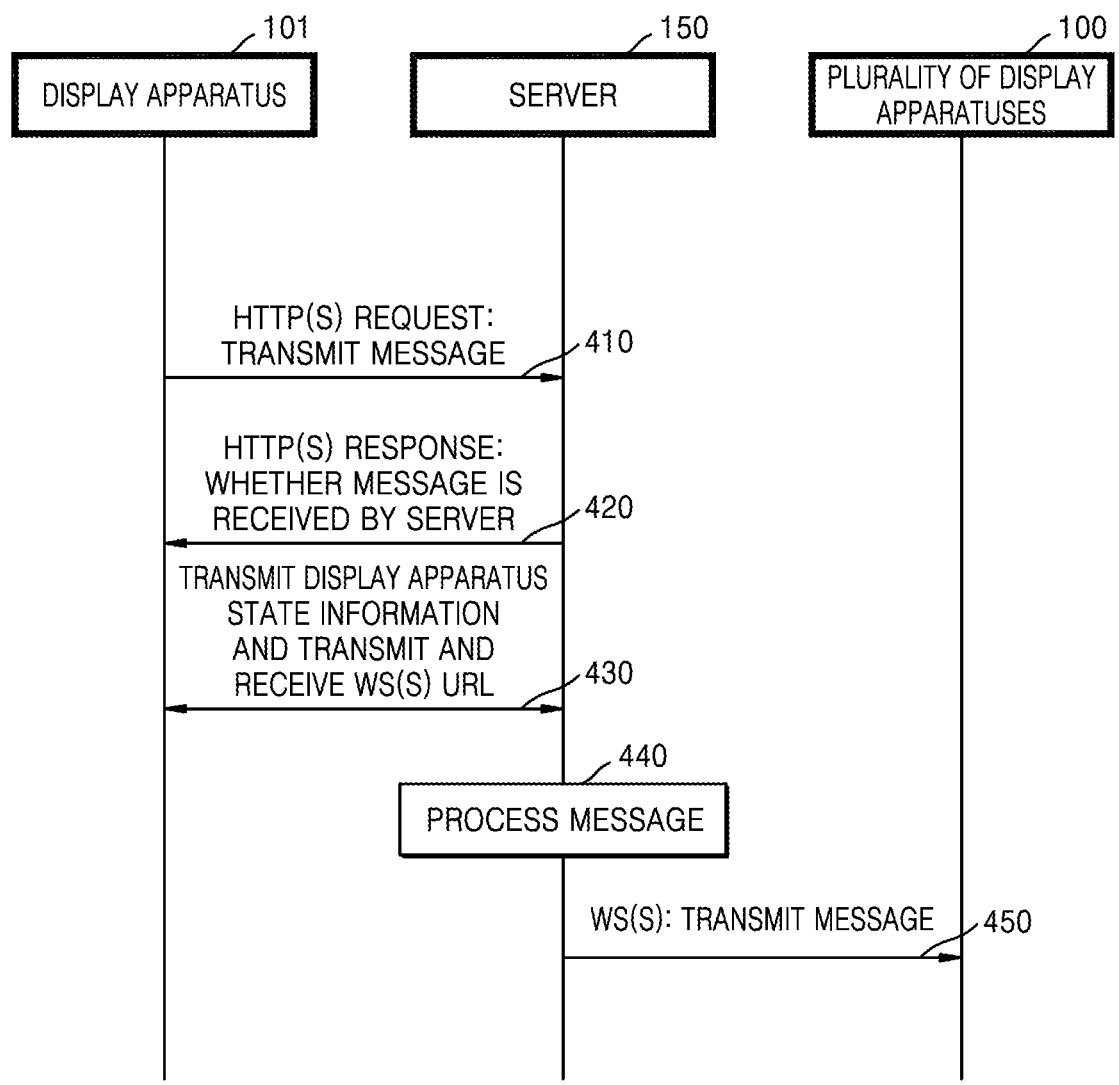
FIG. 4 is a signal flow diagram illustrating an example in which a plurality of display apparatuses and a server transmit and receive chat messages, according various embodiments.

FIG. 4 is a signal flow diagram illustrating an example in which the plurality of display apparatuses 100 and the server 150 transmit and receive chat messages, according to various embodiments.

In an embodiment of the disclosure, the display apparatus 101 may receive a chat message from the user. In an embodiment of the disclosure, the display apparatus 101 may transmit the chat message input by the user, to the server 150 using HTTP (operation 410). For example, the display apparatus 101 may transmit the chat message to the server 150 using a HTTP-based URL for message transmission, which is received from the server 150 in operation 320 of FIG. 3.

In response to the message received from the display apparatus 101, the server 150 may transmit, to the display apparatus 101, a response as to whether the message is received (operation 420).

In an embodiment of the disclosure, the display apparatus 101 may obtain a network latency in consideration of a time period between a time point at which the message is transmitted to the server 150 and a time point at which the response as to whether the message is received is received from the server 150.

In an embodiment of the disclosure, when performing communication with the server 150, the display apparatus 101 may obtain a network latency from time points at which data is transmitted and received, respectively, and transmit, to the server 150, display apparatus state information including the network latency.

In addition, in an embodiment of the disclosure, the display apparatus 101 may newly obtain a network latency whenever data is transmitted to and received from the server 150 even after the display apparatus state information is transmitted to the server 150. For example, in operation 330 of FIG. 3, when the display apparatus state information to the server 150 has been transmitted and new data is then transmitted to and received from the server 150, the display apparatus 101 may newly obtain a network latency between time points at which the new data is transmitted to and received from the server 150, respectively.

In an embodiment of the disclosure, the display apparatus 101 may generate updated display apparatus state information including the newly obtained network latency. In an embodiment of the disclosure, the display apparatus 101 may generate updated display apparatus state information whenever a network latency is newly obtained, or may generate updated display apparatus state information only when a network latency is greater than or equal to a reference value.

In an embodiment of the disclosure, the display apparatus 101 may transmit the updated display apparatus state information to the server 150 (operation 430). In an embodiment of the disclosure, the display apparatus 101 may transmit the updated display apparatus state information to the server 150 and simultaneously request, from the server 150, a new WebSocket protocol-based URL for message reception.

In an embodiment of the disclosure, using the updated display apparatus state information received from the display apparatus 101, the server 150 may newly determine the message throughput at which to transmit messages to the display apparatus 101. The server 150 may determine a new WebSocket protocol-based URL through which to transmit messages at the newly determined message throughput, and transmit the determined WebSocket protocol-based URL to the display apparatus 101 (operation 430).

In an embodiment of the disclosure, the server 150 may adjust the number of messages to be transmitted, based on the newly determined message throughput (operation 440). The server 150 may adjust, according to the newly determined message throughput, the number of messages to be transmitted, by selecting only some of a plurality of chat messages received from the plurality of display apparatuses 100 or adjusting a time period during which to transmit the chat messages.

The server 150 may transmit the plurality of chat messages received from the plurality of display apparatuses 100, to all of the plurality of display apparatuses 100 through WebSocket protocol-based URLs transmitted to the respective display apparatuses (operation 450). In this case, through a new WebSocket protocol-based URL transmitted to the display apparatus 101, the server 150 may transmit, to the display apparatus 101, messages, the number of which is newly adjusted according to the message throughput newly determined based on the updated display apparatus state information received from the display apparatus 101.

As described above, according to an embodiment of the disclosure, the display apparatus 101 may obtain updated display apparatus state information whenever communication with the server 150 is performed or when a network latency is greater than or equal to a reference value.

According to an embodiment of the disclosure, the display apparatus 101 may transmit the updated display apparatus state information to the server 150 and simultaneously request a new WebSocket protocol-based URL from the server 150.

According to an embodiment of the disclosure, upon receiving the updated display apparatus state information from the display apparatus 101, the server 150 may newly determine the message throughput based on the updated display apparatus state information, process messages, and transmit the processed messages to the display apparatus 101 at the determined message throughput. Accordingly, the display apparatus 101 may receive and process chat messages transmitted at a rate adjusted according to a current network situation, thereby providing the user with the chat messages without interruption regardless of a surrounding network situation.

Figure 5:
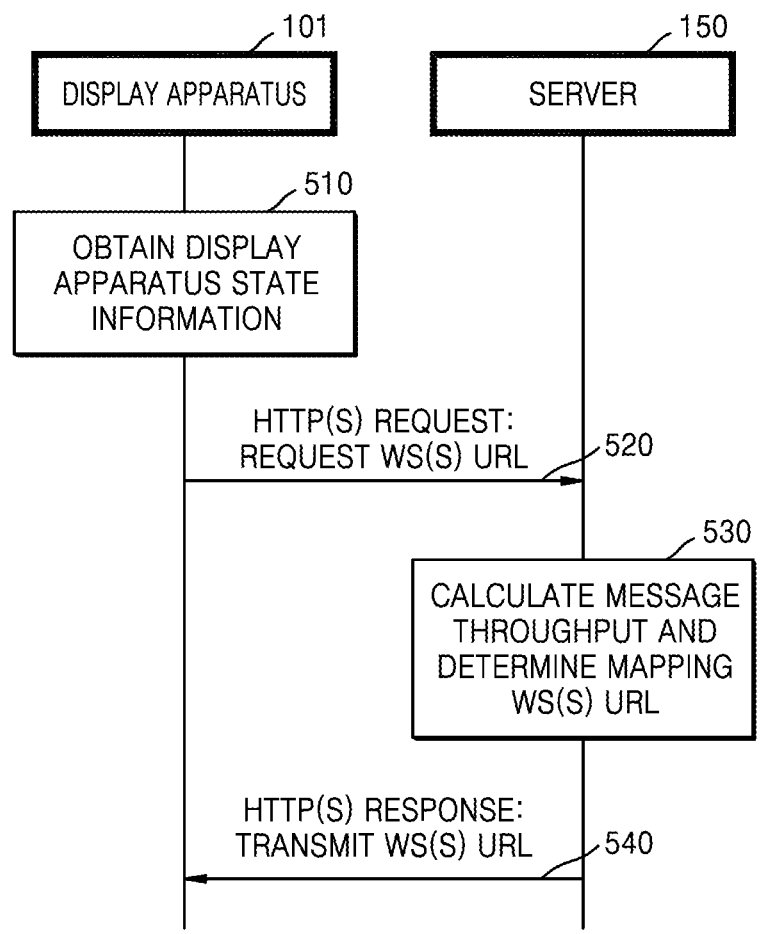
FIG. 5 is a signal flow diagram illustrating an example point in time at which a display apparatus transmits display apparatus state information to a server, according to various embodiments.

FIG. 5 is a signal flow diagram illustrating an example time point (e.g., point in time) at which the display apparatus 101 transmits display apparatus state information to the server 150, according to various embodiments.

Referring to FIG. 5, the display apparatus 101 may obtain display apparatus state information (operation 510). In an embodiment of the disclosure, after obtaining the display apparatus state information, the display apparatus 101 may transmit the display apparatus state information to the server 150 and simultaneously request, from the server 150, a WebSocket protocol-based URL for message transmission, based on HTTP (operation 520). This may be an appropriate method when the server 150 has decent performance to respond whenever the display apparatus 101 calls the server 150.

In an embodiment of the disclosure, the server 150 may calculate a message throughput using the display apparatus state information received from the display apparatus 101, and determine a WebSocket protocol-based URL mapped to the message throughput (operation 530).

The term 'throughput' may refer to an amount of digital data to be transmitted per unit time period from a node or terminal to another terminal on a network, or an amount of data to be processed per unit time period. For example, in a data link, a throughput may be the number of bits per second (e.g., bit/s or bps). In an embodiment of the disclosure, the message throughput may refer to the number of messages to be transmitted per second from the server 150 to the display apparatus 101.

In an embodiment of the disclosure, the server 150 may determine a WebSocket protocol-based URL corresponding to each message throughput. For example, the server 150 may determine a WebSocket protocol-based URL through which to transmit 10 messages per second, for a message throughput of 10 messages per second, and determine another WebSocket protocol-based URL through which to transmit 15 messages per second, for a message throughput of 15 messages per second.

The server 150 may transmit, based on HTTP, a response to the request for the WebSocket protocol-based URL for message transmission, which is transmitted from the display apparatus 101 based on HTTP. In an embodiment of the disclosure, the server 150 may transmit, to the display apparatus 101, a WebSocket protocol-based URL suitable for the display apparatus 101, as the response (operation 540). That is, the server 150 may transmit, to the display apparatus 101, the WebSocket protocol-based URL through which the display apparatus 101 is to receive messages.

The display apparatus 101 may access the WebSocket protocol-based URL provided by the server 150 and then receive messages transmitted from the server 150 at a certain message throughput.

Figure 6:
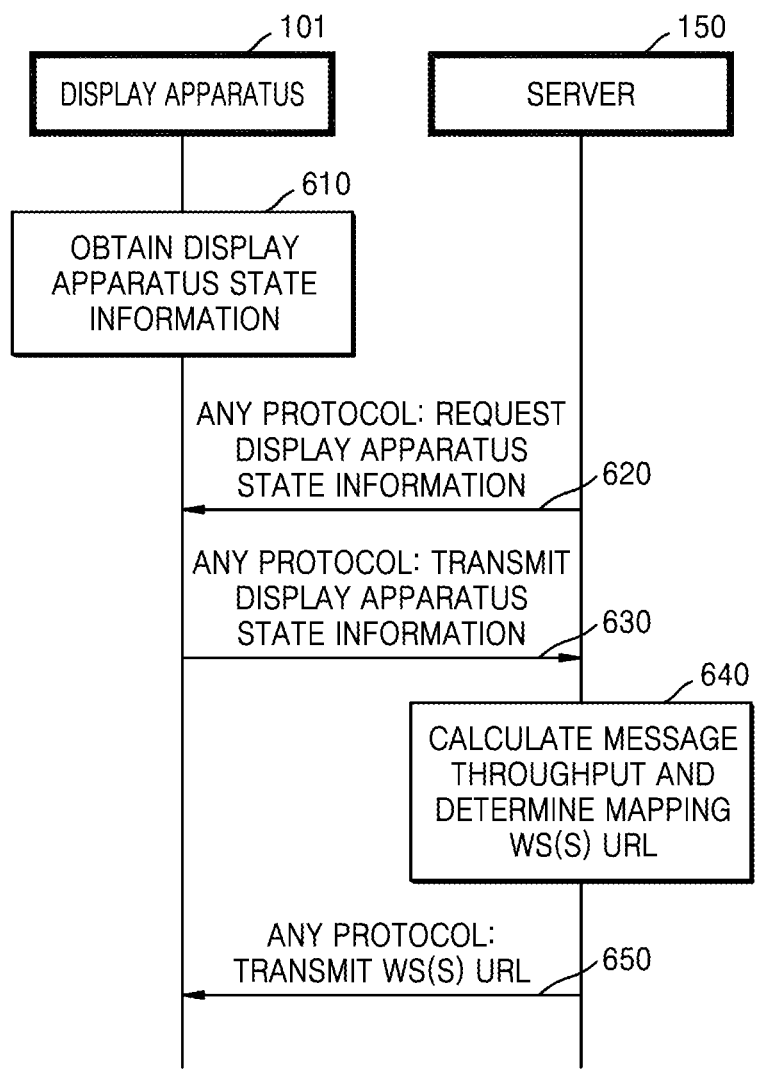
FIG. 6 is a signal flow diagram illustrating an example point in time at which a display apparatus transmits display apparatus state information to a server, according to various embodiments.

FIG. 6 is a signal flow diagram illustrating an example time point at which the display apparatus 101 transmits display apparatus state information to the server 150, according to various embodiments.

Referring to FIG. 6, the display apparatus 101 may obtain display apparatus state information (operation 610), and store the display apparatus state information without transmitting the display apparatus state information to the server 150.

In an embodiment of the disclosure, the server 150 may request the display apparatus 101 to transmit the display apparatus state information (operation 620). Based on HTTP or any protocol other than HTTP, the server 150 may request the display apparatus 101 to transmit the display apparatus state information. This may be a method in which the server 150 performs communication with the display apparatus 101 when the server 150 has a sufficient amount of resources, such that the load on the server 150 is minimized and/or reduced.

In an embodiment of the disclosure, when receiving a request for display apparatus state information from the server 150, the display apparatus 101 may transmit the display apparatus state information to the server 150 in response to the request (operation 630).

In an embodiment of the disclosure, the server 150 may calculate a message throughput using the display apparatus state information received from the display apparatus 101, and determine a WebSocket protocol-based URL mapped to the message throughput (operation 640).

In an embodiment of the disclosure, the server 150 may transmit, to the display apparatus 101, a WebSocket protocol-based URL suitable for the display apparatus 101 (operation 650). Based on HTTP or any other protocol, the server 150 may transmit, to the display apparatus 101, the WebSocket protocol-based URL through which the display apparatus 101 is to receive messages.

The display apparatus 101 may access the WebSocket protocol-based URL provided by the server 150 and then receive messages transmitted from the server 150 at a certain message throughput.

Figure 7:
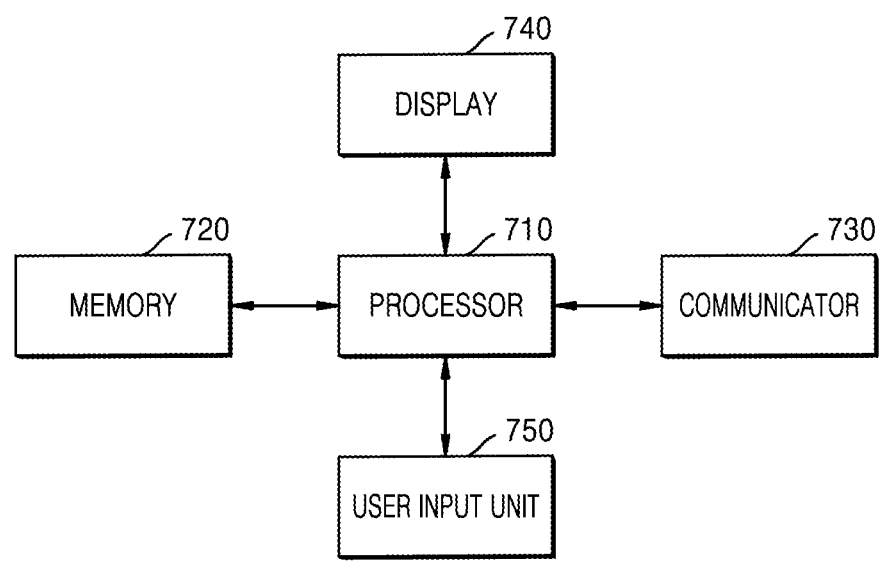
FIG. 7 is a block diagram illustrating an example configuration of a display apparatus according to various embodiments.

FIG. 7 is a block diagram illustrating an example configuration of the display apparatus 101 according to various embodiments.

Referring to FIG. 7, the display apparatus 101 may include a processor (e.g., including processing circuitry) 710, a memory 720, a communicator (e.g., including communication circuitry) 730, a display 740, and a user input unit (e.g., including input circuitry) 750.

In an embodiment of the disclosure, the display apparatus 101 may include an image display apparatus. The image display apparatus may be a digital television (TV) capable of receiving a digital broadcast, but is not limited thereto, and may be implemented as various types of electronic devices. For example, the display apparatus 101 may be implemented as a mobile terminal such as a smart phone. When the display apparatus 101 is a mobile terminal without a digital broadcast reception function, the display apparatus 101 may not output broadcast content but access only the chat server 150 that provides a chat service associated with the broadcast content, receive only a chat room created in relation to the broadcast content and chat messages from the chat server 150, and output the received chat room and chat messages on the screen.

In an embodiment of the disclosure, the display apparatus 101 may receive items, such as TV programs provided by content providers or various movies or dramas through a video-on-demand (VOD) service. The content providers may refer to terrestrial broadcasting stations or cable broadcasting stations providing consumers with a variety of content including videos, over-the-top (OTT) service providers, or internet protocol TV (IPTV) service providers.

In an embodiment of the disclosure, the display apparatus 101 may receive, through a source device, broadcast content data transmitted by a broadcast content server. The source device may include, but is not limited to, a set-top box and a terrestrial receiver.

In an embodiment of the disclosure, the display apparatus 101 may receive information about chat room and chat messages from the server 150 providing a chat service.

In an embodiment of the disclosure, the broadcast content server and the server 150 providing the chat service may be the same server or may be separate servers.

In an embodiment of the disclosure, the display 740 may output broadcast content being received in real time.

The display 740 may include, for example, and without limitation, at least one of a liquid-crystal display, a thin-film-transistor liquid-crystal display, an organic light-emitting diode, a flexible display, a three-dimensional (3D) display, an electrophoretic display, or the like. According to an implementation type of the display apparatus 101, the display apparatus 101 may include at least two displays 740. When the display 740 is implemented as a touch screen, the display 740 may be used as an input device, such as a user interface, in addition to being used as an output device.

In an embodiment of the disclosure, the display 740 may display the broadcast content and a chat room providing a chat service regarding the broadcast content together on one screen. The chat room may refer to an area in which a chat program is executed on the whole or a part of the screen of the display apparatus 101.

In an embodiment of the disclosure, the display 740 may output, in the chat room, a plurality of chat messages transmitted from the server 150.

In an embodiment of the disclosure, the display 740 may output, to a user message input area, a chat message being input by the user through the user input unit 750.

However, as described above, when the display apparatus 101 is a device without a function of receiving a digital broadcast from a broadcast content server in real time, the display 740 may not output the broadcast content, but output only the chat room and chat messages associated with the broadcast content.

In an embodiment of the disclosure, the user input unit 750 may include various input circuitry and receive a user input. In an embodiment of the disclosure, the user input unit 750 may receive a chat message from the user. In an embodiment of the disclosure, the user input unit 750 may receive information about a user account. The information about the user account is information that may be used to verify the user's identity, and may include various types of information, for example, characters, numbers, symbols, biometric information, and the like for identifying or authenticating the user, such as an identifier, a password, a pattern, a fingerprint, an iris, or the like of the user.

In an embodiment of the disclosure, the communicator 730 may include various communication circuitry and connect the display apparatus 101 to a peripheral device, an external device, a server, a mobile terminal, or the like, under the control by the processor 710. The communicator 730 may connect the display apparatus 101 to an external apparatus or a server using a wired or wireless communication network. The communicator 730 may include at least one communication module capable of performing wireless communication. In an embodiment of the disclosure, the communicator 730 may be connected to the server 150 that provides a chat service.

The display apparatus 101 may download a program or an application required by the display apparatus 101 from an external device, the server 150, or the like, or perform web browsing, through the communicator 730.

The communicator 730 may receive a control signal through a control device (not shown), such as a remote controller, under the control by the processor 710. The control signal may be implemented as a Bluetooth-type signal, a radio frequency (RF) signal-type signal, or a Wi-Fi-type signal.

In an embodiment of the disclosure, the communicator 730 may transmit information about the user account to the server 150.

In an embodiment of the disclosure, the communicator 730 may request, from the server 150, a URL for message transmission, and receive, from the server 150, the URL for message transmission.

In an embodiment of the disclosure, the communicator 730 may transmit display apparatus state information to the server 150 and simultaneously request the server 150 to transmit a WebSocket protocol-based URL for message reception.

In an embodiment of the disclosure, the communicator 730 may receive, from the server 150, the WebSocket protocol-based URL for message reception, and may also receive chat messages, the number of which is adjusted according to the display apparatus state information, through the WebSocket protocol-based URL.

In an embodiment of the disclosure, the communicator 730 may receive, from the server 150, a request for display apparatus state information and transmit the display apparatus state information to the server 150.

In an embodiment of the disclosure, the communicator 730 may transmit, to the server 150, a chat message input through the user input unit 750, and receive, from the server 150, a response to the chat message.

In an embodiment of the disclosure, the communicator 730 may receive, from the server 150, information about a chat room, and chat messages generated by the plurality of display apparatuses 100.

The memory 720 according to an embodiment of the disclosure may store at least one instruction. The memory 720 may store at least one program to be executed by the processor 710. A predefined operation rule or program may be stored in the memory 720. In addition, the memory 720 may store data input to or output from the display apparatus 101.

The memory 720 may include at least one of a flash memory-type storage medium, a hard disk-type storage medium, a multimedia card micro-type storage medium, a card-type memory (e.g., SD or XD memory), random-access memory (RAM), static RAM (SRAM), read-only memory (ROM), electrically erasable programmable ROM (EEPROM), programmable ROM (PROM), magnetic memory, a magnetic disk, or an optical disc.

The processor 710 may include various processing circuitry and controls the overall operation of the display apparatus 101. The processor 710 may execute one or more instructions stored in the memory 720 to control the display apparatus 101 to function.

In an embodiment of the disclosure, the processor 710 may access, based on the user account, at least one of a broadcast content server or the server 150 that provides a chat service. The processor 710 may transmit the user account to the server 150 to request a chat service from the server 150, and receive a chat room and chat messages from the server 150. However, this is not essential, and in some cases, the server 150 may not request a user account, and may transmit a chat room and chat messages to the display apparatus 101 that has connected thereto without a user account.

In an embodiment of the disclosure, the processor 710 may obtain display apparatus state information indicating the data processing performance of the display apparatus 101, and transmit the display apparatus state information to the server 150 that provide a chat service, through the communicator 730.

In an embodiment of the disclosure, the processor 710 may receive, through the communicator 730, chat messages transmitted from the server 150 according to a message throughput determined based on the display apparatus state information, and output the received chat messages through the display 740.

In an embodiment of the disclosure, the processor 710 may request, from the server 150, a URL for chat message transmission, and receive, from the server 150, the URL for chat message transmission, which is transmitted in response to the request. The processor 710 may obtain a network latency from a time period between a time point at which the URL for chat message transmission is requested and a time point at which the URL for chat message transmission is received.

In an embodiment of the disclosure, the processor 710 may transmit a chat message input through the user input unit 750, to the server 150 through the communicator 730, and receive, from the server 150, a response thereto as to whether the chat message is received. The processor 710 may obtain a network latency from a time period between a time point at which the chat message is transmitted and a time point at which the response as to whether the chat message is received is received.

In an embodiment of the disclosure, the processor 710 may transmit display apparatus state information to the server 150 and simultaneously request, from the server 150, a WebSocket protocol-based URL for chat message reception, through the communicator 730.

In an embodiment of the disclosure, the processor 710 may receive, from the server 150, a request for transmission of display apparatus state information, and transmit the display apparatus state information to the server 150 in response to the request.

In an embodiment of the disclosure, the processor 710 may receive, from the server 150, a WebSocket protocol-based URL for receiving chat messages transmitted according to a determined message throughput, access the WebSocket protocol-based URL, and then receive the chat messages transmitted from the server 150 according to the message throughput.

In an embodiment of the disclosure, the processor 710 may obtain updated display apparatus state information. The processor 710 may transmit the updated display apparatus state information to the server 150, and receive chat messages transmitted from the server 150 according to a new message throughput determined based on the updated display apparatus state information.

In an embodiment of the disclosure, the processor 710 may receive, from the server 150, a new WebSocket protocol-based URL for receiving chat messages transmitted according to the new message throughput, access the new WebSocket protocol-based URL, and then receive the chat messages transmitted from the server 150 according to the new message throughput.

Figure 8:
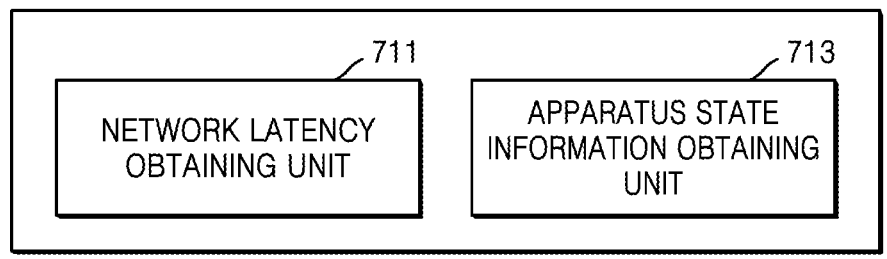
FIG. 8 is a block diagram illustrating an example configuration of a processor included in a display apparatus according to various embodiments.

FIG. 8 is a block diagram illustrating an example configuration of the processor 710 included in a display apparatus according to various embodiments.

In an embodiment of the disclosure, the processor 710 of FIG. 8 may include the processor 710 of FIG. 7.

In an embodiment of the disclosure, the processor 710 may include a display apparatus state information obtaining unit (e.g., including various processing circuitry and/or executable program instructions). In an embodiment of the disclosure, the display apparatus state information obtaining unit may obtain display apparatus state information indicating the data processing performance of the display apparatus 101. In an embodiment of the disclosure, the display apparatus state information obtaining unit may include a network latency obtaining unit (e.g., including various processing circuitry and/or executable program instructions) 711 and an apparatus state information obtaining unit 713.

In an embodiment of the disclosure, each of the network latency obtaining unit 711 and the apparatus state information obtaining unit 713 may be included in the processor 710, in the form of a module.

The term 'module' may refer, for example, to a functional and structural combination of hardware and software for driving the hardware. For example, the term 'module' may refer to a logical unit including certain code and a hardware resource for executing the code, and may not necessarily refer to physically connected code or be limited to one type of hardware.

In an embodiment of the disclosure, the network latency obtaining unit 711 may obtain a network latency by performing communication with the server 150. The term 'network latency' may refer to a delay in terms of response speed. The term 'network latency' may refer to a time period taken for data to travel from one point to a destination. The term 'network latency' may refer to a time period required for a response to return to the side from which data has been transmitted. In this case, the network latency may indicate a response time. When communication is not being seamlessly performed due to an environment, the network latency increases. That the network latency is high may refer, for example, to a response time being long due to low communication efficiency.

In an embodiment of the disclosure, the network latency obtaining unit 711 may obtain a network latency using communication between the display apparatus 101 and the server 150.

In an embodiment of the disclosure, the processor 710 may request data from the server 150 through the communicator 730. The server 150 may transmit, to the display apparatus 101, the data requested by the display apparatus 101 in response to the data request. In an embodiment of the disclosure, the processor 710 may transmit data to the server 150 through the communicator 730, and the server 150 may transmit, to the display apparatus 101, a response as to whether the data is received.

In an embodiment of the disclosure, the network latency obtaining unit 711 may obtain a network latency using a time period between a time point at which data is requested or transmitted to the server 150 and a time point at which a response from the server 150 is received.

In an embodiment of the disclosure, the processor 710 may request a URL for chat message transmission, from the server 150 through the communicator 730. The server 150 may transmit, to the display apparatus 101, the URL for chat message transmission in response to the request from the display apparatus 101. In an embodiment of the disclosure, the network latency obtaining unit 711 may obtain, as a network latency, a time period between a time point at which the display apparatus 710 requests, from the server 150, a URL for chat message transmission and a time point at which the display apparatus 710 receives, from the server 150, the URL for chat message transmission.

In an embodiment of the disclosure, the display apparatus 101 may receive a chat message from the user through the user input unit 750. The display apparatus 101 may transmit the chat message input by the user, to the server 150 through the communicator 730. In response to the message received from the display apparatus 101, the server 150 may transmit, to the display apparatus 101, a response as to whether the message is received. In an embodiment of the disclosure, the network latency obtaining unit 711 may obtain, as a network latency, a time period between a time point at which the display apparatus 101 transmits the chat message to the server 150 and a time point at which the display apparatus 101 receives, from the server 150, the response as to whether the chat message is received.

For example, the network latency obtaining unit 711 may obtain a network latency using Equation 1 below.

[NetworkLatency]=timestamp(HTTP(S)Requestsent)−timestamp(HTTP(S)Responsereceived)   [Equation 1]

In Equation 1, timestamp(HTTP(S)Requestsent) is a timestamp indicating a time point at which an HTTP-based request for data is transmitted to the server 150, and timestamp(HTTP(S)Responsereceived) is a timestamp indicating a time point at which data is received from the server 150 based on HTTP in response to the request.

Although Equation 1 represents a network latency obtained when the display apparatus 101 and the server 150 perform communication using HTTP, the disclosure is not limited thereto, and the display apparatus 101 and the server 150 may perform communication using any communication protocol other than HTTP.

In an embodiment of the disclosure, the apparatus state information obtaining unit 713 may obtain apparatus state information. In an embodiment of the disclosure, the apparatus state information may include at least one of the model, operating system, CPU processing speed, available CPU capacity, or memory capacity of the display apparatus 101. In an embodiment of the disclosure, the apparatus state information obtaining unit 713 may obtain the apparatus state information from system information of the apparatus.

In an embodiment of the disclosure, the apparatus state information may include the model or operating system, CPU processing speed, and the like of the display apparatus 101.

The model of the display apparatus 101 may refer to the type or model of the display apparatus 101.

The operating system of the display apparatus 101 may vary depending on the type of the display apparatus 101. For example, when the display apparatus 101 is a desktop computer or a notebook computer, the operating system may, for example, be Windows, macOS, Linux, Unix, or the like, and when the display apparatus 101 is a mobile terminal, such as a smart phone or a tablet PC, the operating system may, for example, be Android, iOS of Apple, BlackBerry OS of RIM, Tizen of Samsung, or the like. In addition, the performance of the operating system of the display apparatus 101 may vary depending on the version of the operating system, for example, Android 6 or Android 7.

The CPU processing speed of the display apparatus 101 is a speed at which the display apparatus 101 executes and processes a program, and may be measured, for example, in gigahertz (GHz).

In an embodiment of the disclosure, the data processing performance of the display apparatus 101 may vary depending on the type or model, operating system, CPU processing speed and the like of the display apparatus 101. For example, the display scan rate and hardware specification of the display apparatus 101 may vary depending on its type or model. The display scan rate and hardware specification may affect the data processing performance of the display apparatus 101. In addition, when two display apparatuses 101 have the same hardware platform but different operating systems, they differ in data processing performance due to the efficiency of the operating systems.

In an embodiment of the disclosure, the apparatus state information may include an available capacity of a CPU included in the display apparatus 101 or a memory capacity.

The available capacity of the CPU may be a resource that the CPU of the display apparatus 101 may use to execute a program, and the memory capacity may indicate the size of the available capacity of the memory included in the display apparatus 101.

In an embodiment of the disclosure, the data processing performance of the display apparatus 101 may vary depending on the available capacity of the CPU or the memory capacity. As the available CPU capacity increases, more software limitations may be removed, and as the available memory capacity increases, the message processing speed may increase, and thus, the chat message processing performance may be improved. Thus, for example, when the operating system is the latest version but the amount of occupied CPU or memory resources is large, the chat message processing performance of the display apparatus 101 may be reduced.

In an embodiment of the disclosure, the network latency obtaining unit 711 and the apparatus state information obtaining unit 713 may newly obtain the display apparatus state information at preset periods, for example, at preset intervals, at preset time points, or at random time intervals.

The network latency obtaining unit 711 and the apparatus state information obtaining unit 713 may newly obtain the display apparatus state information whenever a certain event occurs.

The certain event may include a change in at least one of the available capacity of the CPU or the memory capacity being greater than or equal to a reference value. When a change in at least one of the available capacity of the CPU or the memory capacity of the display apparatus 101 is greater than or equal to the reference value, the apparatus state information obtaining unit 713 may obtain updated display apparatus state information including the changed available capacity of the CPU or the changed memory capacity.

In addition, the certain event may include new communication being performed between the display apparatus 101 and the server 150. The network latency obtaining unit 711 may newly obtain a network latency from a time point at which data is newly transmitted to or received from the server 150, and obtain the updated display apparatus state information using the newly obtained network latency. In some cases, the network latency obtaining unit 711 may obtain updated display apparatus state information only when a change in the network latency is greater than or equal to a reference value.

As described above, according to an embodiment of the disclosure, the processor 710 may obtain, as display apparatus state information, various pieces of information affecting the data processing performance of the display apparatus 101. In addition, according to an embodiment of the disclosure, the processor 710 may obtain updated display apparatus state information at preset periods or whenever a certain event occurs.

Figure 9:
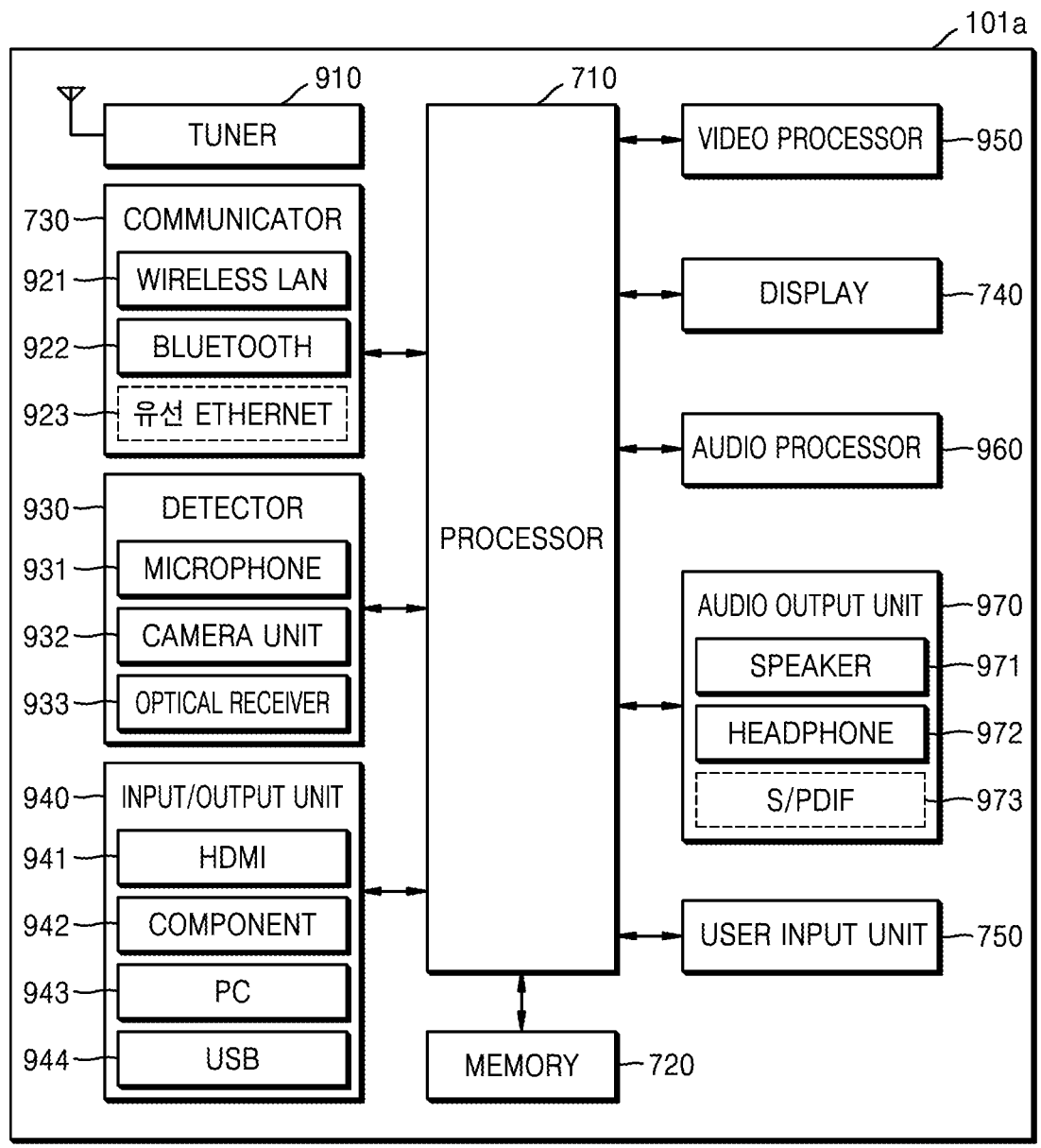
FIG. 9 is a block diagram illustrating an example configuration of a display apparatus according to various embodiments.

FIG. 9 is a block diagram illustrating an example configuration of a display apparatus 101a according to an embodiment of the disclosure.

The display apparatus 101a of FIG. 9 may be an example of the display apparatus 101 of FIG. 7. Hereinafter, descriptions that are already provided above with reference to FIG. 7 may not be repeated.

Referring to FIG. 7, the display apparatus 101a may further include a tuner 910, a detector (e.g., including detecting circuitry) 930, an input/output unit (e.g., including input/output circuitry) 940, a video processor (e.g., including video processing circuitry) 950, an audio processor (e.g., including audio processing circuitry) 960, and an audio output unit (e.g., including audio output circuitry) 970, in addition to the processor 710, the memory 720, the communicator 730, the display 740, and the user input unit 750.

The tuner 910 may be tuned to and select only a frequency of a channel desired to be received by the display apparatus 101a from among a number of radio wave components by performing amplification, mixing, resonance, or the like on broadcast content or the like received in a wired or wireless manner. Content received via the tuner 910 is decoded to be separated into an audio, a video, and/or additional information. The audio, video, and/or additional information may be stored in the memory 720 under the control by the processor 710.

The communicator 730 may include various communication circuitry and connect the display apparatus 101a to a peripheral device, an external device, a server, a mobile terminal, or the like, under the control by the processor 710. The communicator 730 may include at least one communication module capable of performing wireless communication. The communicator 730 may include at least one of a wireless local area network (WLAN) module 921, a Bluetooth module 922, or a wired Ethernet module 923, in accordance with the performance and structure of the display apparatus 101a.

The Bluetooth module 922 may receive a Bluetooth signal transmitted from a peripheral device according to a Bluetooth communication standard. The Bluetooth module 922 may be a Bluetooth Low Energy (BLE) communication module, and may receive a BLE signal. The Bluetooth module 922 may continuously or temporarily perform BLE signal scanning to detect whether a BLE signal is received. The WLAN module 921 may transmit and receive a Wi-Fi signal to and from a peripheral device according to a Wi-Fi communication standard.

In an embodiment of the disclosure, the communicator 730 may transmit information about a user account to the server 150 using a communication module.

In an embodiment of the disclosure, the communicator 730 may transmit display apparatus state information to the server 150, and receive, from a chat server, chat messages, the number of which is adjusted to be suitable for the display apparatus state information.

In an embodiment of the disclosure, the communicator 730 may transmit, to the server 150, a chat message input through the user input unit 750, and receive, from the chat server, a response to the chat message.

In an embodiment of the disclosure, the communicator 730 may receive, from the server 150, information about a chat room, and chat messages generated by the plurality of display apparatuses 100.

The detector 930 may include various detecting circuitry and detect a voice, an image, or an interaction of the user, and may include a microphone 931, a camera unit 932, and an optical receiver 933. The microphone 931 may receive an audio signal including a voice uttered by the user or noise, convert the received audio signal into an electrical signal, and output the electrical signal to the processor 710.

The camera unit 932 may include a sensor (not shown) and a lens (not shown), and may capture an image formed on a screen, and transmit the captured image to the processor 710.

The optical receiver 933 may receive an optical signal (including a control signal). The optical receiver 933 may receive an optical signal corresponding to a user input (e.g., a touch, a push, a touch gesture, a voice, or a motion) from a control device such as a remote controller or a mobile phone.

The input/output unit 940 may include various input/output circuitry and receive a video (e.g., a moving image signal or a still image signal), an audio (e.g., a voice signal or a music signal), and additional information from a device external to the display apparatus 101a under the control by the processor 710.

The input/output unit 940 may include one of a high-definition multimedia interface (HDMI) port 941, a component jack 942, a PC port 942, or a universal serial bus (USB) port 944. The input/output unit 940 may include a combination of the HDMI port 941, the component jack 942, the PC port 943, and the USB port 944.

The video processor 950 may include various video processing circuitry and process image data to be displayed by the display 740, and may perform various image processing operations, such as decoding, rendering, scaling, noise filtering, frame rate conversion, and resolution conversion, on the image data.

In an embodiment of the disclosure, the video processor 950 may render a chat message input through the user input unit 750 or a chat message received from the server 150, into a HyperText Markup Language (HTML) format.

The display 740 may output, on a screen, content received from a broadcasting station, an external server, or an external storage medium. The content is a media signal, and may include a video signal, an image, a text signal, etc.

In an embodiment of the disclosure, the display 740 may output video content received from a broadcasting station, and a chat room and chat messages received from the server 150 together on one screen.

The audio processor 960 may include various audio processing circuitry and process audio data. The audio processor 960 may perform various processing operations such as decoding, amplifying, noise filtering, or the like, on the audio data.

The audio output unit 970 may include various audio output circuitry and output an audio included in content received through the tuner 910, an audio input through the communicator 730 or the input/output unit 940, and an audio stored in the memory 720, under the control by the processor 710. The audio output unit 970 may include at least one of a speaker 971, a headphone 972, or a Sony/Philips Digital Interface (S/PDIF) output port 973.

The user input unit 750 may include various input circuitry and receive a user input for controlling the display apparatus 101. The user input unit 750 may include, but is not limited to, various types of user input devices including a touch panel for detecting a touch of the user, a button for receiving a push manipulation of the user, a wheel for receiving a rotation manipulation of the user, a keyboard, a dome switch, a microphone for voice recognition, a motion sensor for sensing a motion, and the like. When a remote controller or other mobile terminal controls the display apparatus 101a, the user input unit 750 may receive a control signal received from the mobile terminal.

In an embodiment of the disclosure, the user input unit 750 may receive information about a user account. In an embodiment of the disclosure, the user input unit 750 may receive a chat message from the user.

Figure 10:
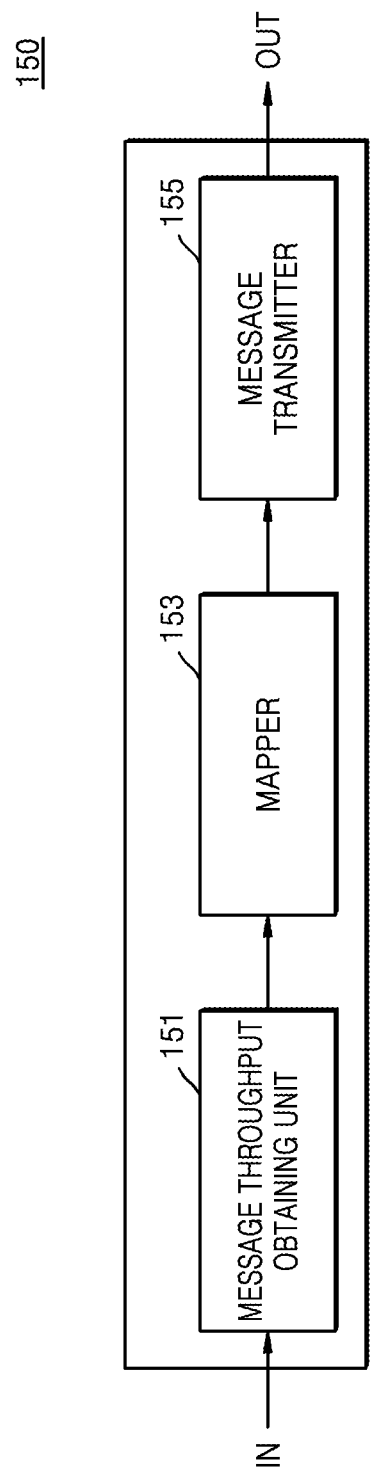
FIG. 10 is a block diagram illustrating an example configuration of a chat server according to various embodiments.

FIG. 10 is block diagram illustrating an example configuration of the chat server 150 according to various embodiments.

Referring to FIG. 10, the server 150 may include a message throughput obtaining unit (e.g., including various processing circuitry and/or executable program instructions) 151, a mapper (e.g., including various processing circuitry and/or executable program instructions) 153, and a message transmitter (e.g., including various processing circuitry and/or executable program instructions) 155.

In an embodiment of the disclosure, each of the message throughput obtaining unit 151, the mapper 153, and the message transmitter 155 may be a unit for processing at least one function or operation, and may be implemented as a module. The module may be implemented with hardware, software, or a combination of hardware and software.

In an embodiment of the disclosure, the message throughput obtaining unit 151 may receive, as input data IN, display apparatus state information from the display apparatus 101, and determine an appropriate message throughput according to the data processing performance of the display apparatus 101 using the input data IN.

In an embodiment of the disclosure, the server 150 may store, in advance, a table including information about message throughputs previously calculated according to models or operating systems of a plurality of display apparatuses that may use a chat service, and network latencies. For example, the server 150 may store, in advance, a table as shown in Table 1.

TABLE 1

| Device model | OS version | Latency (ms) | throughput |
|---|---|---|---|
| Galaxy 8 or older | Any | Any | 2 |
| Galaxy 9 or newer | Android 6 or lower | Any | 3 |
| | Android 7 or higher | 100 ms or less | 10 |
| | | 101 ms or greater | 5 |
| 2021 Smart TV Q series | Tizen xx or higher | 100 ms or less | 5 |
| . . . | . . . | . . . | . . . |

In an embodiment of the disclosure, the message throughput obtaining unit 151 may obtain information about the model, operating system, and a network latency of the display apparatus 101 from display apparatus state information received from the display apparatus 101, and determine a message throughput suitable for the display apparatus 101 by searching Table 1 for a message throughput corresponding to the model, OS, and network latency of the display apparatus 101.

In an embodiment of the disclosure, the server 150 may store, in advance, a table including information about message throughputs previously calculated according to available CPU capacities and available memory capacities of a plurality of display apparatuses that may use a chat service, and network latencies. For example, the server 150 may store, in advance, a table as shown in Table 2.

TABLE 2

| CPU (%) | Memory (MB) | Latency (ms) | throughput |
|---|---|---|---|
| 50% or greater | 200 MB or greater | 100 ms or less | 10 |
| | 200 MB or greater | 101 ms or greater | 5 |
| . . . | . . . | . . . | . . . |

In an embodiment of the disclosure, the message throughput obtaining unit 151 may obtain information about the available CPU capacity, the available memory capacity, and the network latency of the display apparatus 101 from the display apparatus state information received from the display apparatus 101, and search previously stored Table 2 for a message throughput corresponding to the available CPU capacity, the available memory capacity, and the network latency of the display apparatus 101.

In an embodiment of the disclosure, when the display apparatus state information includes information about all of the model, operating system, available CPU capacity, available memory capacity, and network latency of the display apparatus 101, the message throughput obtaining unit 151 may determine the message throughput by applying weights to respective elements of the display apparatus state information in consideration of Tables 1 and 2.

In an embodiment of the disclosure, the message throughput obtaining unit 151 may directly calculate the message throughput using the display apparatus state information received from the display apparatus 101. For example, the message throughput obtaining unit 151 may calculate the message throughput using Equation 2 below.

[Equation 2]

$$AppropriateThroughput = \\ MAX\left(\left[\frac{BaseThroughput \times AvailableCPU\ \% \times AvailableMemory\ \% \times BaseLatency}{MeasuredLatency} \times \alpha\right], 1\right)$$

Here, α denotes a constant that is set according to a service state.

For example, when Base Throughput is 30, available CPU is 50%, available memory is 50%, Base Latency is 300 ms, measured latency is 150 ms, and service constant α is 1, appropriate throughput is 30×0.5×0.5×300/150×1=15.

However, Equation 2 is an example, and the message throughput obtaining unit 151 may calculate the message throughput by adjusting a according to the network state or the surrounding situation, or may calculate the message throughput using another equation according to the situation.

In an embodiment of the disclosure, the message throughput obtaining unit 151 may obtain message throughputs for respective display apparatuses. For example, the message throughput obtaining unit 151 may obtain a first message throughput based on first display apparatus state information received from a first display apparatus, which is one of the plurality of display apparatuses, and obtain a second message throughput based on second display apparatus state information received from a second display apparatus among the plurality of display apparatuses.

In an embodiment of the disclosure, the mapper 153 may determine a WebSocket protocol-based URL mapped to a message throughput. In an embodiment of the disclosure, the mapper 153 may determine a WebSocket protocol-based URL to be mapped to a message throughput obtained by the message throughput obtaining unit 151 with respect to each of the plurality of display apparatuses to be connected.

In an embodiment of the disclosure, the mapper 153 may transmit the determined WebSocket protocol-based URL to the corresponding display apparatus to allow the display apparatus to access the determined WebSocket protocol-based URL.

In an embodiment of the disclosure, the mapper 153 may transmit, to the first display apparatus, a first WebSocket protocol-based URL mapped to the first message throughput, and transmit, to the second display apparatus, a second WebSocket protocol-based URL mapped to the second message throughput.

In an embodiment of the disclosure, the message transmitter 155 may transmit chat messages at the message throughput obtained by the message throughput obtaining unit 151, using the WebSocket protocol-based URL determined by the mapper 153. In an embodiment of the disclosure, with respect to chat messages received from the plurality of display apparatuses 100, the message transmitter 155 may adjust the number of chat messages to be transmitted to each display apparatus, according to a message throughput, and transmit the adjusted number of chat messages to the display apparatus through a WebSocket protocol-based URL.

In an embodiment of the disclosure, with respect to chat messages received from the plurality of display apparatuses, the message transmitter 155 may adjust the number of chat messages to be transmitted per second, to N (here, N is a natural number) according to the first message throughput, and transmit N chat messages per second to the first display apparatus through the first WebSocket protocol-based URL.

In an embodiment of the disclosure, with respect to the chat messages received from the plurality of display apparatuses, the message transmitter 155 may adjust the number of chat messages to be transmitted per second, to M (here, M is a natural number different from N) according to the second message throughput, and transmit M chat messages per second to the second display apparatus through the second WebSocket protocol-based URL.

Figure 11:
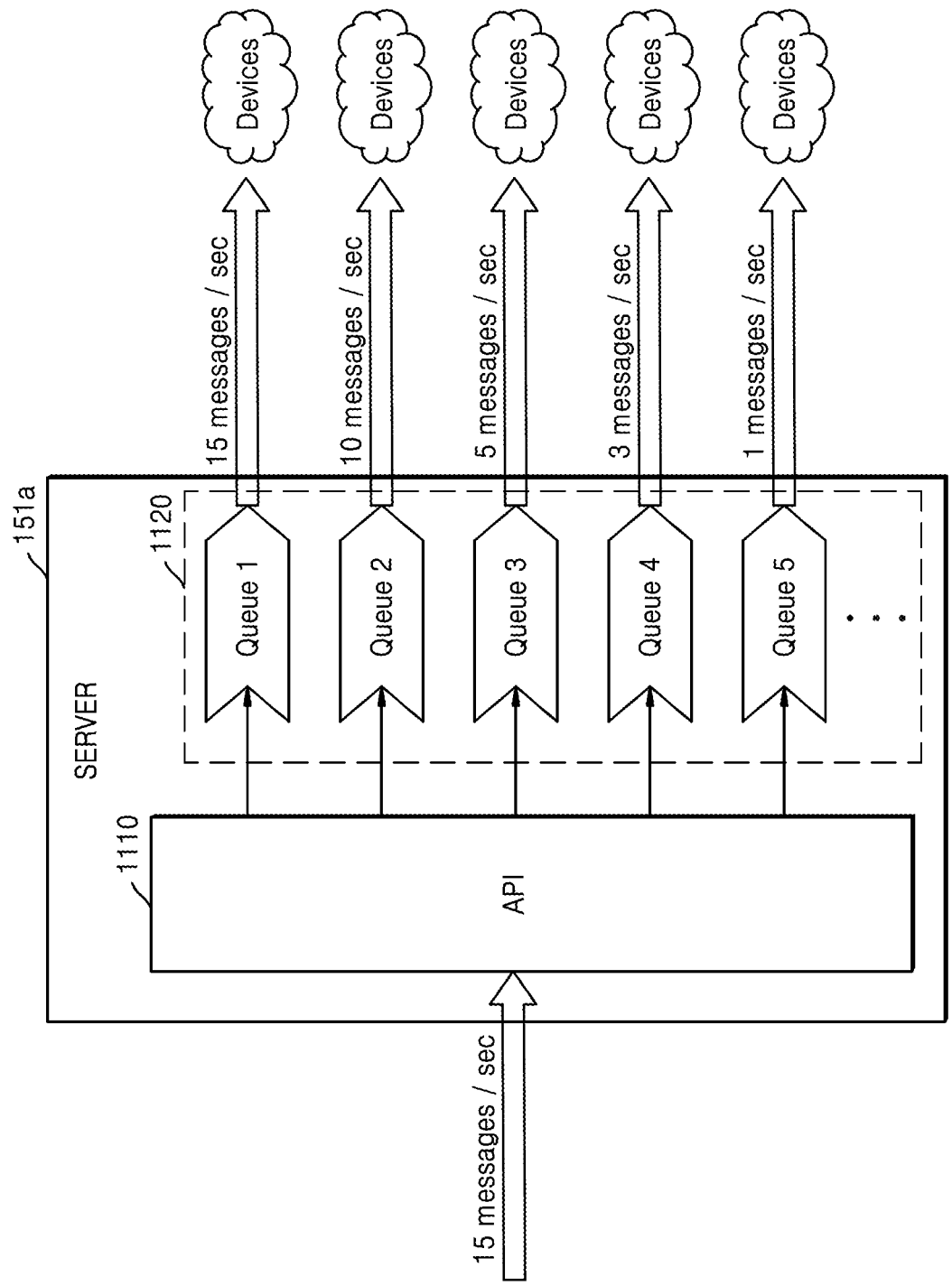
FIG. 11 is a diagram illustrating an example in which a chat server transmits chat messages according to message throughputs, according to various embodiments.

FIG. 11 is a diagram illustrating an example in which a chat server 151a transmits chat messages according to message throughputs, according to various embodiments.

The chat server 151a illustrated in FIG. 11 may be an example of the server 150 of FIG. 1.

Referring to FIG. 11, the chat server 151a may include an application programming interface (API) 1110 and queues 1120.

Although not illustrated in FIG. 11, the chat server 151a may further include a CPU (or a processor). The CPU may obtain a message throughput based on display apparatus state information received from the display apparatus 101, and control the API 1110 and the queues 1120 to transmit, to the display apparatus 101, chat messages, the number of which is adjusted according to the message throughput.

The API 1110 may receive chat messages from the plurality of display apparatuses 100. For example, in FIG. 11, the API 1110 may receive 15 chat messages per second from the plurality of display apparatuses 100.

In an embodiment of the disclosure, the API 1110 may include an interface providing a function of processing a chat message. The API 1110 may configure a chat message by selecting an appropriate template according to characteristics of information or message to be shared. For example, the API 1110 may configure a message in the form of a message template class object provided by a JavaScript Object Notation (JSON) object, but is not limited thereto.

In an embodiment of the disclosure, the chat server 151a may include the queues 1120. In an embodiment of the disclosure, the queues 1120 may perform an operation performed by the message transmitter 155 illustrated in FIG. 10.

In an embodiment of the disclosure, the chat server 151a may include a plurality of queues. The API 1110 may configure a chat message according to a template and transmit the chat message to the plurality of queues included in the queues 1120. For example, the API 1110 may transmit 15 chat messages per second to all of the plurality of queues included in the queues 1120, for example, to Queues 1 to 5.

In an embodiment of the disclosure, the queues 1120 may be stored in a RAM memory inside the chat server 151a, and may perform a function of adjusting, according to a message throughput, the number of chat messages to be transmitted. Each queue may transmit the adjusted number of chat messages to the corresponding display apparatus through a WebSocket protocol-based URL connected to the queue.

In an embodiment of the disclosure, a CPU included in the chat server 151a may calculate message throughputs for the plurality of display apparatuses, respectively, and inform the queues of target values for the numbers of messages to be transmitted that the queues are to adjust, respectively. Each of the plurality of queues may receive 15 chat messages per second from the API 1110, and adjust the number of chat messages to be transmitted, according to the message throughput informed of by the CPU.

In an embodiment of the disclosure, the plurality of queues may differently adjust the numbers of messages to be transmitted, according to different message throughputs, respectively. For example, as illustrated in FIG. 11, the number of messages that Queue 1 is to transmit per second is 15, and thus Queue 1 may not necessarily adjust the number of chat messages to be transmitted, with respect to the chat messages received from the API 1110. Queue 2 may adjust the number of chat messages to be transmitted, with respect to the chat messages received from API 1110, to transmit the messages at a throughput of 10 messages per second. Queue 3 may adjust the number of chat messages to be transmitted, based on a throughput of 5 messages per second, and Queues 4 and 5 may adjust the numbers of chat messages to be transmitted, based on throughputs of 3 messages per second and 1 message per second, respectively. However, this is an example, and when the number of display apparatuses to which messages are to be transmitted at the same message throughput is excessively large, different queues may respectively adjust the numbers of messages to be transmitted, based on the same message throughput, in order to prevent and/or reduce a plurality of display apparatuses from being simultaneously connected to the same queue and thus causing a lag. In this case, the different queues may transmit, through different WebSocket protocol-based URLs, the equally adjusted number of messages to display apparatuses accessing the WebSocket protocol-based URLs, respectively.

In an embodiment of the disclosure, the queues 1120 may omit some of the chat messages received from the plurality of display apparatuses, in order to adjust the number of messages to be transmitted.

For example, Queue 3, which is to transmit 5 messages per second, may transmit only a certain number of chat messages received earlier among the chat messages received from the plurality of display apparatuses, for example, only first 5 chat messages among 15 messages received per second, through a WebSocket protocol-based URL connected to the queue, and omit transmission of the 10 subsequent chat messages.

Queue 3 may transmit only a certain number of chat messages received later among the chat messages received from the plurality of display apparatuses, for example, only last 5 messages among 15 messages received per second, and omit transmission of the 10 preceding chat messages.

Queue 3 may randomly select a certain number of chat messages from among the chat messages received from the plurality of display apparatuses, for example, 5 chat messages, and transmit only the randomly selected 5 messages.

Queue 3 may integrate or omit redundant duplicate chat messages among the chat messages received from the plurality of display apparatuses. For example, Queue 3 may identify chat messages containing the same keyword among a plurality of chat messages, and omit some of the chat messages when the number of chat messages containing the same keyword is greater than or equal to a preset number. Alternatively, when the content of a chat message is simple as 'Hi', Queue 3 may omit transmission of the chat message.

Queue 3 may adjust the number of chat messages to be transmitted, by adjusting a time period during which to transmit the chat messages received from the plurality of display apparatuses. For example, Queue 3 may continuously transmit 5 messages per second for a preset time period. That is, Queue 3 may receive 15 messages per second from the API 1110, and continuously transmit 5 messages in order of reception. Queue 3 may continuously transmit 5 messages per second until all messages to be transmitted are transmitted, or until the chat service is terminated.

Queues 2 to 5 may select, from among the chat messages received from the plurality of display apparatuses, chat messages to be transmitted, based on accounts of users of the display apparatuses. For example, based on the user accounts, when the number of people registered as friends of a user, for example, the number of people registered as followers or friends is large, the chat server 151*a* may apply a weight to chat messages transmitted from the corresponding user account and select the chat messages.

Queues 2 to 5 may apply a weight to messages of a user who has frequently participated in chat rooms, and then select messages to be transmitted, from among the chat messages received from the plurality of display apparatuses. For example, based on the user accounts, when a user has frequently participated in chat rooms associated with the same or similar genre, for example, entertainment programs, the chat server 151*a* may apply a weight to chat messages transmitted from the corresponding user account and thus select the chat messages.

Queues 2 to 5 may apply a weight to a chat message with a high frequency of a keyword highly related to broadcast content being broadcast, among the chat messages received from the plurality of display apparatuses. Using EPG information about the broadcast content currently being broadcast, the chat server 151*a* may obtain degrees of correlation between the EPG information and chat messages, and select a chat message containing a keyword having a degree of correlation greater than or equal to a reference value.

The chat server 151*a* may analyze at least one of a video or an audio of the broadcast content currently being broadcast, in real time using at least one neural network, and infer a degree of correlation between the broadcast content and a chat message to apply a weight to the chat message. To this end, the chat server 151*a* may use a neural network trained using various types of content and messages related thereto as training data. The chat server 151*a* may input broadcast content and a chat message to the neural network to obtain a relationship between the broadcast content and the chat message or a weight from the neural network and then select a chat message having a high degree of correlation.

In an embodiment of the disclosure, a plurality of queues that adjust the numbers of messages to be transmitted, based on different message throughputs, respectively, may transmit, using different WebSocket protocol-based URLs, chat messages to display apparatuses connected to the WebSocket protocol-based URLs, respectively. That is, one WebSocket protocol-based URL may be mapped and connected to one queue in a one-to-one manner.

In an embodiment of the disclosure, a CPU may inform each queue of a WebSocket protocol-based URL through which the queue is to transmit messages. In addition, in an embodiment of the disclosure, the CPU or the queues may inform each of a plurality of display apparatuses of a WebSocket protocol-based URL to access. Each display apparatus may access the WebSocket protocol-based URL informed of by the server 151*a*.

In an embodiment of the disclosure, each queue may push a chat message to a particular WebSocket protocol-based URL connected to the queue to transmit the chat message to a display apparatus connected to the WebSocket protocol-based URL. The plurality of display apparatuses may access a WebSocket protocol-based URL connected to one queue to simultaneously receive a chat message from the queue at a particular message throughput.

As described above, according to an embodiment of the disclosure, the server 151*a* may determine an appropriate message throughput according to the data processing performance of each display apparatus, adjust the number of messages to be transmitted, based on the determined message throughput, and then transmit the adjusted number of messages to the display apparatus.

Figure 12:
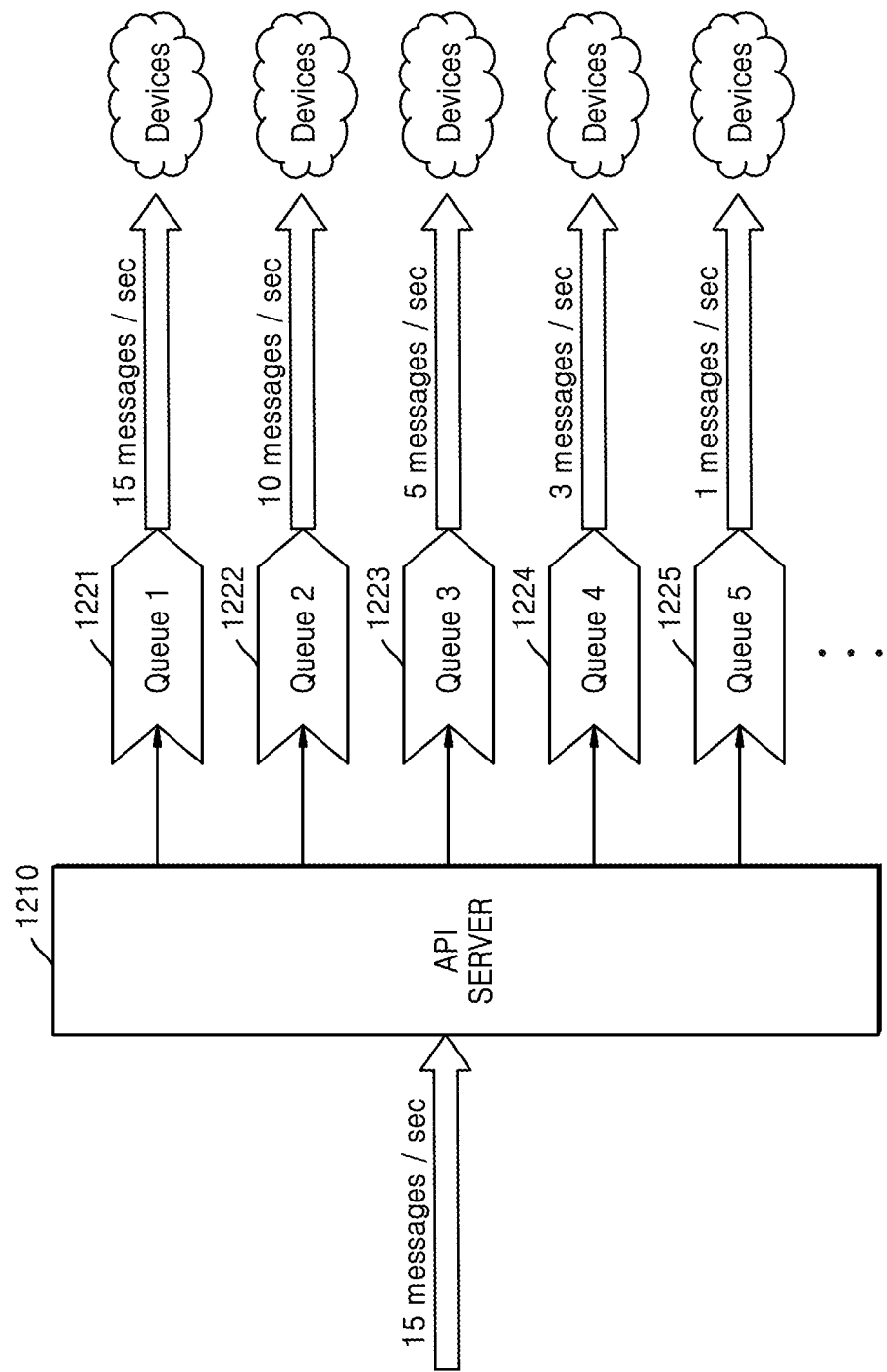
FIG. 12 is a diagram illustrating an example in which a chat server transmits chat messages according to message throughputs, according to various embodiments.

FIG. 12 is a diagram illustrating an example in which a chat server 151*b* transmits chat messages according to message throughputs, according to various embodiments.

The chat server 151*b* illustrated in FIG. 11 may be another example of the server 150 of FIG. 1.

Referring to FIG. 12, the chat server 151*b* may include an API server 1210 and queue servers 1221, 1222, 1223, 1224 and 1225. In the chat server 151*b* of FIG. 12, the API and the queues are implemented as separate servers. For example, the chat server 151*b* of FIG. 12 may include the API server 1210, which may include its own CPU and memory. The API server 1210 may perform a function of responding to a request from a display apparatus. In FIG. 12, queues are implemented as the queue servers 1221 to 1225, and each of the queue servers 1221 to 1225 includes a CPU and a memory, and thus the CPU included in each queue server may directly adjust the number of messages to be transmitted, according to a message throughput.

The API server 1210 and the queue servers 1221 to 1225 of FIG. 12 may have the same functions as those of the API 1110 and the queues 1120 of FIG. 11, except that the API server 1210 and the queue servers 1221 to 1225 are implemented as separate servers.

The API server 1210 may receive chat messages from a plurality of display apparatuses, configure chat messages according to a template, and transmit the configured chat messages to each of the queue servers 1221 to 1225. In an embodiment of the disclosure, the queue servers 1221 to 1225 may receive chat messages from the API server 1210, adjust the numbers of chat messages to be transmitted, according to message throughputs, respectively, and transmit the adjusted numbers of chat messages to the display apparatuses, respectively.

In an embodiment of the disclosure, the queue servers 1221 to 1225 may differently adjust the numbers of messages to be transmitted, according to different message throughputs, and transmit, using different WebSocket protocol-based URLs, the adjusted numbers of chat messages to the display apparatuses connected to the WebSocket protocol-based URLs, respectively.

In an embodiment of the disclosure, each of the queue servers 1221 to 1225 may push a chat message to a particular WebSocket protocol-based URL connected to the queue to transmit the chat message to a display apparatus connected to the WebSocket protocol-based URL.

Figure 13:
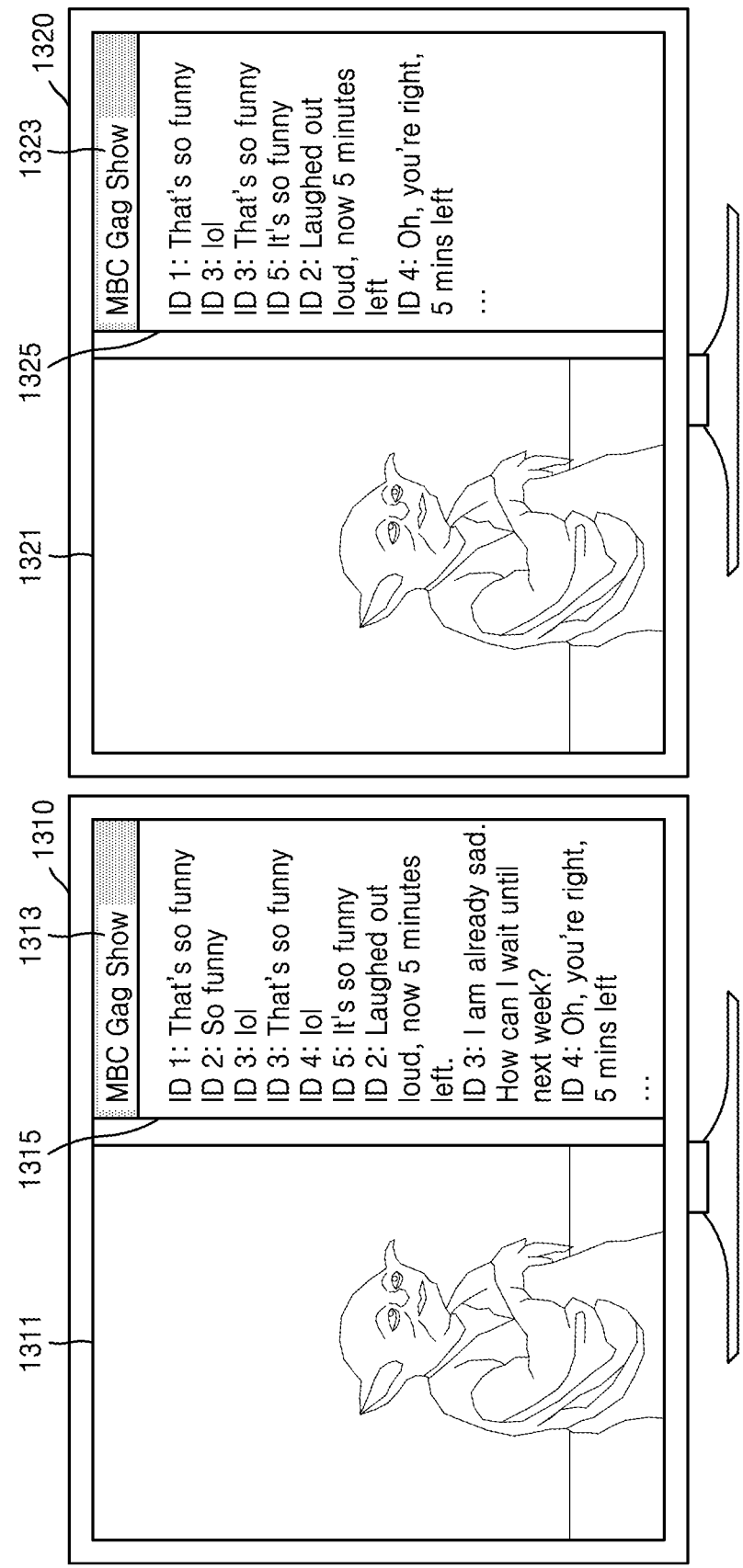
FIG. 13 is a diagram illustrating an example in which display apparatuses receive chat messages, the numbers of which are adjusted to be suitable for the display apparatuses, respectively, and output the received chat messages on their screens, according to various embodiments.

FIG. 13 is a diagram illustrating an example in which first and second display apparatuses 1310 and 1320 receive chat messages, the numbers of which are adjusted to be suitable for the display apparatuses 1310 and 1320, respectively, and output the received chat messages on their screens, according to various embodiments.

FIG. 13 illustrates a case in which the first display apparatus 1310 and the second display apparatus 1320 are connected to a same server 150 to use a chat service. Each of the first display apparatus 1310 and the second display apparatus 1320 may output broadcast content 1311 or 1321 and a chat room together on one screen. The chat room may include information 1313 or 1323 about the chat room and chat messages 1315 or 1325.

In an embodiment of the disclosure, the first display apparatus 1310 may obtain first display apparatus state information and transmit the first display apparatus state information to the server 150. In addition, the second display apparatus 1320 may obtain second display apparatus state information and transmit the second display apparatus state information to the server 150.

In an embodiment of the disclosure, it is assumed that the data processing performance of the first display apparatus 1310 is better than the data processing performance of the second display apparatus 1320. Accordingly, the first display apparatus 1310 may process a greater number of messages per second than does the second display apparatus 1320.

In an embodiment of the disclosure, the server 150 may receive the first display apparatus state information from the first display apparatus 1310, and determine a message throughput suitable for the data processing performance of the first display apparatus 1310 to be, for example, 10 messages per second, based on the first display apparatus state information. The server 150 may determine a message throughput suitable for the data processing performance of the second display apparatus 1320 to be, for example, 5 messages per second, based on the second display apparatus state information received from the second display apparatus 1320.

In an embodiment of the disclosure, it is assumed that the server 150 receives 10 chat messages per second from a plurality of display apparatuses. In this case, a first queue included in the server 150 may receive 10 messages per second, and transmit 10 messages per second to the first display apparatus 1310 through a first WebSocket protocol-based URL without adjusting the number of messages to be transmitted. In addition, in an embodiment of the disclosure, a second queue included in the server 150 may receive 10 messages per second, adjust the number of messages to be transmitted to be 5 messages per second, and transmit 5 chat messages per second to the second display apparatus 1320 through a second WebSocket protocol-based URL.

For example, the second queue may select only 5 chat messages received earlier, from among 10 chat messages received per second from the plurality of display apparatuses. Alternatively, the second queue may select only 5 chat messages received later, from among 10 chat messages received per second from the plurality of display apparatuses. The second queue may randomly select 5 chat messages from among 10 chat messages received per second from the plurality of display apparatuses. The second queue may select 5 chat messages per second by omitting 5 duplicate messages. The second queue may apply a weight to a chat message transmitted from an account having a particular identifier, based on user accounts, and select the chat message. The second queue may continuously transmit, at a rate of 5 chat messages per second, chat messages being received at a rate of 10 chat messages per second, in order of reception until all chat messages are transmitted.

As illustrated in FIG. 13, the number of chat messages 1325 being output by the second display apparatus 1320 is less than the number of chat messages 1315 being output by the first display apparatus 1310. That is, the second display apparatus 1320 may receive, process, and output chat messages at a rate adjusted to be suitable for the performance of the second display apparatus 1320, thereby providing user convenience by outputting chat messages on the screen without interruption even though it has lower performance than that of the first display apparatus 1310.

Figure 14:
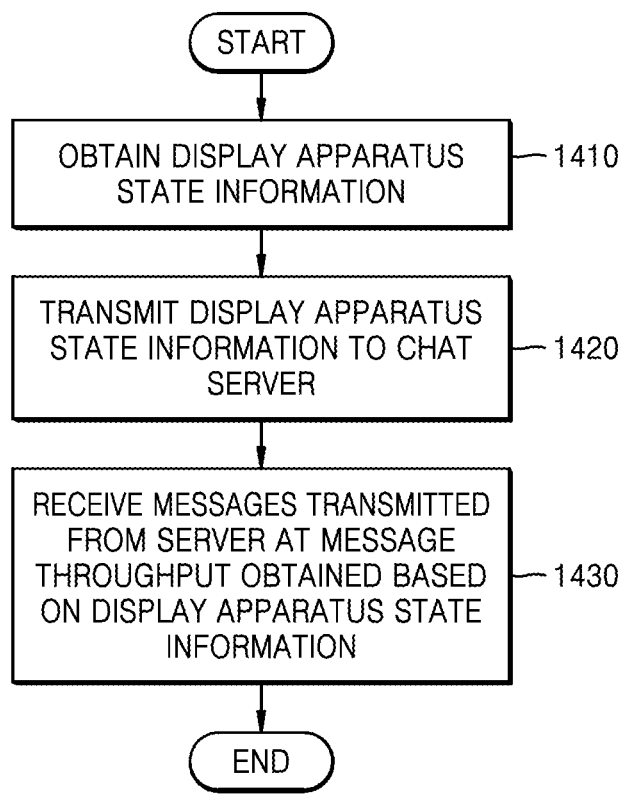
FIG. 14 is a flowchart illustrating an example method of operating a display apparatus according to various embodiments.

FIG. 14 is a flowchart illustrating an example method of operating a display apparatus according to various embodiments.

Referring to FIG. 14, the display apparatus may obtain display apparatus state information indicating the data processing performance of the display apparatus (operation 1410).

In an embodiment of the disclosure, the display apparatus state information may include at least one of apparatus state information or network state information. The apparatus state information may include at least one of the model, operating system, CPU processing speed, available CPU capacity, or memory capacity of the display apparatus, and the network state information may include a network latency.

In an embodiment of the disclosure, the display apparatus may transmit the display apparatus state information to a chat server (operation 1420).

In an embodiment of the disclosure, the display apparatus may transmit the display apparatus state information and simultaneously request, from the server, a WebSocket protocol-based URL for chat message reception. Alternatively, in an embodiment of the disclosure, the display apparatus may receive, from the server, a request for transmission of the display apparatus state information, and transmit the display apparatus state information to the server in response to the request.

In an embodiment of the disclosure, the display apparatus may receive messages transmitted from the server at a message throughput obtained based on the display apparatus state information (operation 1430).

The display apparatus may render the messages received from the server and output the rendered messages on the screen.

Figure 15:
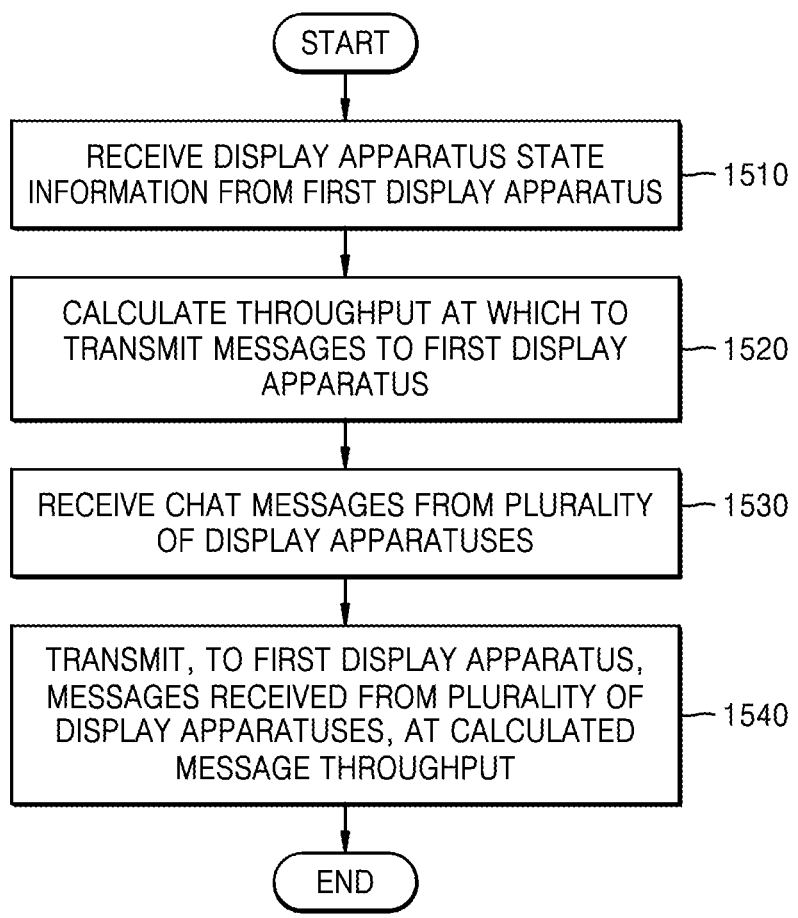
FIG. 15 is a flowchart illustrating an example method of operating a server according to various embodiments.

FIG. 15 is a flowchart illustrating an example method of operating a server according to various embodiments.

Referring to FIG. 15, the server may receive display apparatus state information from a first display apparatus (operation 1510).

In an embodiment of the disclosure, the server may request the first display apparatus to transmit the display apparatus state information, and receive the display apparatus state information transmitted from the display apparatus in response to the request. The server may receive the display apparatus state information transmitted together with a request for a WebSocket protocol-based URL from the first display apparatus.

In an embodiment of the disclosure, the server may calculate a message throughput at which to transmit messages to the first display apparatus (operation 1520).

In an embodiment of the disclosure, based on the display apparatus state information received from the first display apparatus, the server may calculate the message throughput at which to transmit messages to the first display apparatus.

In an embodiment of the disclosure, the server may receive chat messages from a plurality of display apparatuses using a chat service (operation 1530).

In an embodiment of the disclosure, with respect to the chat messages received from the plurality of display apparatuses, the server may adjust the number of messages to be transmitted to the first display apparatus, according to the message throughput.

In an embodiment of the disclosure, the server may adjust the number of chat messages to be transmitted, by transmitting only some of the chat messages received from the plurality of display apparatuses, or by adjusting a time period during which to transmit the chat messages received from the plurality of display apparatuses. For example, the server may select only some of the chat messages received from the plurality of display apparatuses to adjust the number of messages to be transmitted, using at least one of a scheme of transmitting only a certain number of chat messages received earlier among the chat messages received from the plurality of display apparatuses, a scheme of transmitting only a certain number of chat messages received later among the chat messages received from the plurality of display apparatuses, a scheme of transmitting only a certain number of randomly selected chat messages, a scheme of omitting duplicate messages, or a scheme of selecting and transmitting chat messages based on accounts of users of the plurality of display apparatuses.

In an embodiment of the disclosure, the server may transmit, to the first display apparatus, the messages received from the plurality of display apparatuses, at the calculated message throughput (operation 1540).

A display apparatus and an operating method thereof according to various embodiments of the disclosure may be implemented as a recording medium including computer-executable instructions such as a computer-executable program module. A non-transitory computer-readable medium may be any available medium which is accessible by a computer, and may include a volatile or non-volatile medium and a removable or non-removable medium. The computer-readable media may include computer storage media and communication media. The computer storage media include both volatile and non-volatile, removable and non-removable media implemented in any method or technique for storing information such as computer readable instructions, data structures, program modules or other data. The communication medium typically includes computer-readable instructions, data structures, program modules, other data of a modulated data signal, or other transmission mechanisms, and examples thereof include an arbitrary information transmission medium.

In addition, the display apparatus and the operating method thereof according to embodiments of the disclosure described above may be implemented as a computer program product including a non-transitory computer-readable recording medium having recorded thereon a program for implementing an operating method of a display apparatus, and the operating method may include obtaining display apparatus state information indicating data processing performance of the display apparatus, transmitting the display apparatus state information to a server that provides a chat service, receiving chat messages transmitted from the server according to a message throughput determined based on the display apparatus state information, and outputting the received chat messages.

A machine-readable storage medium may be provided in the form of a non-transitory storage medium. The 'non-transitory storage medium' may refer, for example, to a tangible device and does not include a signal (e.g., an electromagnetic wave), and the term 'non-transitory storage medium' does not distinguish between a case where data is stored in a storage medium semi-permanently and a case where data is stored temporarily. For example, the non-transitory storage medium may include a buffer in which data is temporarily stored.

According to an embodiment of the disclosure, the method according to various embodiments disclosed herein may be included in a computer program product and provided. The computer program product may be traded between a seller and a purchaser as a commodity. The computer program product may be distributed in the form of a machine-readable storage medium (e.g., a compact disc-ROM (CD-ROM)), or may be distributed online (e.g., downloaded or uploaded) through an application store or directly between two user devices (e.g., smart phones). In the case of online distribution, at least a portion of the computer program product (e.g., a downloadable app) may be temporarily stored in a machine-readable storage medium such as a manufacturer's server, an application store's server, or a memory of a relay server.

The above description is provided only for illustrative purposes, and those of skill in the art will understand that the disclosure may be easily modified into other detailed configurations without modifying technical aspects and essential features of the disclosure. Therefore, it should be understood that the above-described embodiments of the disclosure are examples in all respects and are not limited. For example, the elements described as single entities may be distributed in implementation, and similarly, the elements described as distributed may be combined in implementation.

What is claimed is:

1. A display apparatus comprising:
a display;
communication circuitry;
a memory including one or more instructions; and at least one processor, wherein one or more of the at least one processor is configured, by executing the one or more instructions in the memory, to:
receive, through the communication circuitry, from a server configured to provide a chat service, a first uniform resource locator (URL) for transmitting chat messages,
obtain display apparatus state information indicating data processing performance of the display apparatus,
based on the first URL being received, transmit, through the communication circuitry, to the server, the display apparatus state information,
receive, through the communication circuitry, from the server, a second URL for receiving chat messages transmitted from the server according to a first message throughput determined based on the display apparatus state information,
receive, through the communication circuitry, chat messages transmitted from the server, and
output the received chat messages through the display.

2. The display apparatus of claim 1, wherein the display apparatus state information includes at least one of apparatus state information or network state information,
the display apparatus state information includes at least one of a model of the display apparatus, an operating system of the display apparatus, a central processing unit (CPU) processing speed of the display apparatus, an available CPU capacity of the display apparatus, or a memory capacity of the display apparatus, and
the network state information includes a network latency.

3. The display apparatus of claim 2, wherein one or more of the at least one processor is configured, by executing the one or more instructions, to:
request, from the server through the communication circuitry, the first URL,
receive the first URL transmitted from the server in response to the request, and
obtain the network latency from a time period between a first point in time at which the first URL is requested and a second point in time at which the first URL is received.

4. The display apparatus of claim 2, further comprising an input unit comprising input circuitry,
wherein one or more of the at least one processor is configured, by executing the one or more instructions, to:
transmit a first chat message, input through the input unit, to the server through the communication circuitry,
receive a response regarding whether the first chat message is received by the server, the response being transmitted from the server in response to the first chat message, and
obtain the network latency from a time period between a first point in time at which the first chat message is transmitted and a second point in time at which the response regarding whether the first chat message is received is received.

5. The display apparatus of claim 1, wherein one or more of the at least one processor is configured, by executing the one or more instructions, to:
transmit, to the server through the communication circuitry, the display apparatus state information and request, simultaneously with the transmitting of the display apparatus state information, from the server through the communication circuitry, the second URL, the second URL comprising a WebSocket protocol-based URL.

6. The display apparatus of claim 1, wherein one or more of the at least one processor is configured, by executing the one or more instructions, to:
receive, through the communication circuitry, from the server, a request for transmission of the display apparatus state information, and
transmit, through the communication circuitry, the display apparatus state information to the server in response to the request.

7. The display apparatus of claim 1, wherein the second URL is a WebSocket protocol-based URL and one or more of the at least one processor is configured, by executing the one or more instructions, to:
receive the chat messages transmitted from the server by accessing the WebSocket protocol-based URL.

8. The display apparatus of claim 1, wherein one or more of the at least one processor is configured, by executing the one or more instructions, to:
obtain updated display apparatus state information,
transmit, through the communication circuitry, the updated display apparatus state information to the server, and
receive, through the communication circuitry, chat messages transmitted from the server according to a second message throughput determined based on the updated display apparatus state information.

9. The display apparatus of claim 8, wherein one or more of the at least one processor is configured, by executing the one or more instructions, to:
receive, through the communication circuitry, from the server, a third URL for receiving chat messages transmitted according to the second message throughput, and
receive, through the communication circuitry, the chat messages transmitted from the server according to the second message throughput by accessing the third URL.

10. A server configured to provide a chat service, the server comprising:
communication circuitry configured to perform communication with a plurality of display apparatuses;
queues configured to store messages, the queues including a first queue and a second queue; and
at least one processor, wherein one or more of the at least one processor is configured, by executing one or more instructions, to:
determine a first message throughput based on first display apparatus state information received from a first display apparatus among the plurality of display apparatuses,
control the first queue to adjust to N, N being a natural number, a number of chat messages to be transmitted per second, with respect to chat messages received from the plurality of display apparatuses, according to the first message throughput, and
transmit N chat messages per second to the first display apparatus through a first WebSocket protocol-based uniform resource locator (URL) mapped to the first message throughput,
determine a second message throughput based on second display apparatus state information received from a second display apparatus among the plurality of display apparatuses, and control the second queue to adjust to M, M being a natural number different from N, the number of chat messages to be transmitted per second, with respect to the chat messages received from the plurality of display apparatuses, according to the second message throughput, and transmit M chat messages per second to the second display apparatus through a second WebSocket protocol-based URL mapped to the second message throughput, wherein the first message throughput is different from the second message throughput, and the first WebSocket protocol-based URL is different from the second WebSocket protocol-based URL.

11. The server of claim 10, wherein at least one of the first queue or the second queue is configured to adjust the number of chat messages to be transmitted, according to the first determined message throughput or the second determined message throughput, respectively, by transmitting some of the chat messages received from the plurality of display apparatuses, or by adjusting a time period during which to transmit the chat messages received from the plurality of display apparatuses, and transmit some of the chat messages received from the plurality of display apparatuses, using at least one of a scheme of transmitting a certain number of chat messages received earlier among the chat messages received from the plurality of display apparatuses, a scheme of transmitting a certain number of chat messages received later among the chat messages received from the plurality of display apparatuses, a scheme of transmitting a certain number of randomly selected chat messages, a scheme of omitting duplicate messages, or a scheme of selecting and transmitting chat messages based on accounts of users of the plurality of display apparatuses.

12. A method of operating a display apparatus, the method comprising:

receiving, from a server configured to provide a chat service, a first uniform resource locator (URL) for transmitting chat messages;

obtaining display apparatus state information indicating data processing performance of the display apparatus;

based on the first URL being received, transmitting the display apparatus state information to the server;

receiving, from the server, a second URL for receiving chat messages transmitted from the server according to a first message throughput determined based on the display apparatus state information;

receiving chat messages transmitted from the server; and outputting the received chat messages.

13. The method of claim 12, wherein the display apparatus state information includes at least one of apparatus state information or network state information, the display apparatus state information includes at least one of a model of the display apparatus, an operating system of the display apparatus, a central processing unit (CPU) processing speed of the display apparatus, an available CPU capacity of the display apparatus, or a memory capacity of the display apparatus, and the network state information includes a network latency.

14. The method of claim 12, wherein the transmitting of the display apparatus state information to the server includes transmitting, to the server, the display apparatus state information and, simultaneously with the transmitting of the display apparatus state information, requesting, from the server, the second URL, the second URL comprising a WebSocket protocol-based URL.

15. The method of claim 12, further comprising receiving, from the server, a request for transmission of the display apparatus state information, wherein the transmitting of the display apparatus state information to the server includes transmitting the display apparatus state information to the server in response to receiving, from the server, the request for transmission of the display apparatus state information.

* * * * *